United States Patent
Yang et al.

(10) Patent No.: US 12,464,416 B2
(45) Date of Patent: Nov. 4, 2025

(54) FEEDBACK CODEBOOK CONSTRUCTION FOR CONTROL CHANNEL CARRIER SWITCHING

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 17/885,208

(22) Filed: Aug. 10, 2022

(65) Prior Publication Data

US 2024/0056908 A1 Feb. 15, 2024

(51) Int. Cl.
*H04W 36/00* (2009.01)
*H04W 72/044* (2023.01)
*H04W 72/20* (2023.01)

(52) U.S. Cl.
CPC ... *H04W 36/0055* (2013.01); *H04W 36/0016* (2013.01); *H04W 72/044* (2013.01); *H04W 72/20* (2023.01)

(58) Field of Classification Search
CPC ......... H04W 36/0055; H04W 36/0016; H04W 72/044; H04W 72/20; H04L 1/1861
See application file for complete search history.

(56) References Cited

U.S. PATENT DOCUMENTS

2016/0261391 A1* 9/2016 Chen ............... H04L 1/1861
2022/0279456 A1* 9/2022 Babaei ............. H04W 52/146

OTHER PUBLICATIONS

International Search Report and Written Opinion—PCT/US2023/022857—ISA/EPO—Oct. 19, 2023 (2205344WO).
Caict: "UE Feedback Enhancements for HARQ-ACK", 3GPP TSG WG1 Meeting #108-e, R1-2201599, 3rd Generation Partnership Project, Mobile Competence Centre, 650, Route Des Lucioles, F-06921 Sophia-Antipolis Cedex, France, vol. RAN WG1, No. e-Meeting, Feb. 21-Mar. 3, 2022, Feb. 14, 2022, 8 Pages, XP052109627, Last Page, Last Par.

(Continued)

*Primary Examiner* — Mohammad S Anwar
(74) *Attorney, Agent, or Firm* — Holland & Hart LLP

(57) ABSTRACT

Methods, systems, and devices for wireless communications are described. A user equipment (UE) may generate feedback messages according to a feedback codebook according to a feedback scheme indicating whether the UE is to include, or exclude, feedback information for physical downlink shared channels (PDSCHs) occurring prior to a bandwidth part (BWP) switch. For example, the UE may determine whether to include feedback information for any PDSCHs that occur prior to an uplink BWP switch for a UE that supports cell switching based on the cell in which the uplink BWP switch occurs, the cell in which the feedback message is scheduled for transmission (e.g., the same cell in which the PDSCHs occur, or a different cell), and a mode of PUCCH cell switching (e.g., dynamic or semi-static). The UE may also determine whether to send retransmissions of feedback information after a BWP switch.

30 Claims, 18 Drawing Sheets

(56) References Cited

OTHER PUBLICATIONS

LG Electronics: "Remaining Issues on HARQ-ACK Feedback Enhancements", R1- 2204616, 3GPP TSG RAN WG1 #109-e, 3rd Generation Partnership Project, Mobile Competence Centre, 650, Route Des Lucioles, F-06921 Sophia-Antipolis Cedex, vol. RAN WG-1, No. e-Meeting, May 9-May 20, 2022, Apr. 25, 2022, 8 Pages, XP052138141, p. 1-section 1, Alt. 2, Alt. 2A, p. 2-Par. 2, Par. 4, Par. 5.
Partial International Search Report—PCT/US2023/022857—ISA/EPO—Aug. 28, 2023 (2205344WO).

* cited by examiner

FEEDBACK CODEBOOK CONSTRUCTION FOR CONTROL CHANNEL CARRIER SWITCHING

FIELD OF TECHNOLOGY

The following relates to wireless communications, including feedback codebook construction for control channel carrier switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support feedback codebook construction for control channel carrier switching. A user equipment (UE) may generate feedback messages according to a feedback codebook according to a feedback scheme indicating whether the UE is to include, or exclude, feedback information for physical downlink shared channels (PDSCHs) occurring prior to a bandwidth part (BWP) switch. For example, the UE may determine whether to include feedback information for any PDSCHs that occur prior to an uplink BWP switch for a UE that supports cell switching based on the cell in which the uplink BWP switch occurs, the cell in which the feedback message is scheduled for transmission (e.g., the same cell in which the PDSCHs occur, or a different cell), and a mode of PUCCH cell switching (e.g., dynamic or semi-static).

In some examples, the UE may support retransmission of feedback signaling (e.g., in the case of dropped feedback signaling). In such examples, the UE may transmit, or refrain from transmitting, the retransmission of the feedback message based on one or more rules or conditions, where a BWP switch occurs prior to the retransmission. For example, if one or more conditions are satisfied (e.g., if the UE is not instructed to perform physical uplink control channel (PUCCH) cell switching, if the UE is triggered to perform PUCCH cell switching but there is an uplink BWP switch on one of the two cells, or if downlink BWP switching occurs on any configured downlink serving cell), then the UE may either treat the triggered retransmission as an error or ignore the trigger and refrain from transmitting the retransmission, or may send the retransmission of the feedback message according to the timing of the second BWP.

A method for wireless communications at a user equipment (UE) is described. The method may include receiving control signaling to perform a cell switch between a first cell and a second cell of a cell group, receiving a downlink data message during a first time interval that occurs prior to a BWP switch, where a second time interval after the first time interval is allocated for a feedback message associated with the downlink data message, and transmitting a feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

An apparatus for wireless communications at a UE is described. The apparatus may include a processor, memory coupled with the processor, and instructions stored in the memory. The instructions may be executable by the processor to cause the apparatus to receive control signaling to perform a cell switch between a first cell and a second cell of a cell group, receive a downlink data message during a first time interval that occurs prior to a BWP switch, where a second time interval after the first time interval is allocated for a feedback message associated with the downlink data message, and transmit a feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

Another apparatus for wireless communications at a UE is described. The apparatus may include means for receiving control signaling to perform a cell switch between a first cell and a second cell of a cell group, means for receiving a downlink data message during a first time interval that occurs prior to a BWP switch, where a second time interval after the first time interval is allocated for a feedback message associated with the downlink data message, and means for transmitting a feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

A non-transitory computer-readable medium storing code for wireless communications at a UE is described. The code may include instructions executable by a processor to receive control signaling to perform a cell switch between a first cell and a second cell of a cell group, receive a downlink data message during a first time interval that occurs prior to a BWP switch, where a second time interval after the first time interval is allocated for a feedback message associated with the downlink data message, and transmit a feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

In some examples of the method, apparatuses, and non-transitory computer-readable medium described herein, receiving the control signaling may include operations, features, means, or instructions for receiving radio resource control (RRC) signaling indicating that the cell switch may be based on a semi-static cell switching mode, where the feedback scheme indicates whether to exclude or include the feedback information corresponding to the downlink data message based on the semi-static cell switching mode.

Some examples of the method, apparatuses, and non-transitory computer-readable medium described herein may further include operations, features, means, or instructions for performing the BWP switch from a first BWP to a second BWP on the first cell that may be a primary cell, where the feedback scheme indicates to exclude the feedback information corresponding to the downlink data message based on performing the BWP switch on the primary cell.

In some examples of the method, apparatuses, and non-transitory computer-readable medium described herein, transmitting the feedback message may include operations, features, means, or instructions for transmitting the feedback message on the second cell, where the first cell includes a primary cell and the second cell includes a secondary cell, and where the feedback scheme indicates to exclude the feedback information corresponding to the downlink data message based on performing the BWP switch on the second cell and the feedback message being transmitted on the second cell.

In some examples of the method, apparatuses, and non-transitory computer-readable medium described herein, transmitting the feedback message may include operations, features, means, or instructions for transmitting the feedback message on the first cell, where the first cell includes a primary cell and the second cell includes a secondary cell, and where the feedback scheme indicates to include the feedback information corresponding to the downlink data message based on performing the BWP switch on the second cell and the feedback message being transmitted on the first cell.

In some examples of the method, apparatuses, and non-transitory computer-readable medium described herein, receiving the control signaling may include operations, features, means, or instructions for receiving control signaling indicating that the cell switch may be based on a dynamic cell switching mode, where the feedback scheme indicates to exclude or include the feedback information corresponding to the downlink data message based on the dynamic cell switching mode.

In some examples of the method, apparatuses, and non-transitory computer-readable medium described herein, the feedback scheme indicates to exclude the feedback information corresponding to the downlink data message based on performing the BWP switch on the cell on which the feedback message may be scheduled.

In some examples of the method, apparatuses, and non-transitory computer-readable medium described herein, the feedback scheme indicates to include the feedback information corresponding to the downlink data message based on performing the BWP switch on a different cell than the cell on which the feedback message may be scheduled.

Some examples of the method, apparatuses, and non-transitory computer-readable medium described herein may further include operations, features, means, or instructions for performing the cell switch between the first cell and the second cell of the cell group according to a cell switching mode indicated in the control signaling.

A method for wireless communications at a UE is described. The method may include monitoring for one or more downlink data messages, the one or more downlink data messages associated with a first time interval allocated for transmission of a feedback message associated with the one or more downlink data messages on a first cell, performing a BWP switch from a first BWP to a second BWP on the first cell prior to a second time interval that occurs after the first time interval, receiving downlink control information (DCI) triggering a retransmission of the feedback message, and retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

An apparatus for wireless communications at a UE is described. The apparatus may include a processor, memory coupled with the processor, and instructions stored in the memory. The instructions may be executable by the processor to cause the apparatus to monitor for one or more downlink data messages, the one or more downlink data messages associated with a first time interval allocated for transmission of a feedback message associated with the one or more downlink data messages on a first cell, perform a BWP switch from a first BWP to a second BWP on the first cell prior to a second time interval that occurs after the first time interval, receive DCI triggering a retransmission of the feedback message, and retransmit, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

Another apparatus for wireless communications at a UE is described. The apparatus may include means for monitoring for one or more downlink data messages, the one or more downlink data messages associated with a first time interval allocated for transmission of a feedback message associated with the one or more downlink data messages on a first cell, means for performing a BWP switch from a first BWP to a second BWP on the first cell prior to a second time interval that occurs after the first time interval, means for receiving DCI triggering a retransmission of the feedback message, and means for retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

A non-transitory computer-readable medium storing code for wireless communications at a UE is described. The code may include instructions executable by a processor to monitor for one or more downlink data messages, the one or more downlink data messages associated with a first time interval allocated for transmission of a feedback message associated with the one or more downlink data messages on a first cell, perform a BWP switch from a first BWP to a second BWP on the first cell prior to a second time interval that occurs after the first time interval, receive DCI triggering a retransmission of the feedback message, and retransmit, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

Some examples of the method, apparatuses, and non-transitory computer-readable medium described herein may further include operations, features, means, or instructions for determining not to retransmit the feedback message during the second time interval in accordance with the feedback retransmission scheme indicating an error case based on one or more of whether cell switching may be configured for the first cell, on which of the first cell or a second cell switching from the first BWP to the second BWP occurs, or on which of the first cell or second cell the retransmission of the feedback message may be scheduled.

Some examples of the method, apparatuses, and non-transitory computer-readable medium described herein may further include operations, features, means, or instructions for determining not to retransmit the feedback message during the second time interval in accordance with the feedback retransmission scheme indicating to skip the retransmission based on one or more of whether cell switching may be configured for the first cell, on which of the first cell or a second cell switching from the first BWP to the second BWP occurs, or on which of the first cell or second cell the retransmission of the feedback message may be scheduled.

Some examples of the method, apparatuses, and non-transitory computer-readable medium described herein may further include operations, features, means, or instructions for determining whether to retransmit the feedback message or skip the feedback message in accordance with the feedback retransmission scheme based on whether receiving the DCI occurs before or after performing the BWP switch.

Some examples of the method, apparatuses, and non-transitory computer-readable medium described herein may further include operations, features, means, or instructions for receiving control signaling indicating a timing offset between the first time interval allocated for the transmission of the feedback message and a third time interval in which the DCI triggering the retransmission of the feedback message may be received, where retransmitting the feedback message occurs on the second BWP and may be based on the timing offset according to a time interval duration associated with the second BWP.

Some examples of the method, apparatuses, and non-transitory computer-readable medium described herein may further include operations, features, means, or instructions for retransmitting the feedback message in a first uplink time interval of the second BWP that overlaps in time with a second uplink time interval of the first BWP, where the second uplink time interval of the first BWP occurs after the timing offset.

In some examples of the method, apparatuses, and non-transitory computer-readable medium described herein, the first BWP includes an uplink BWP on the first cell and the second BWP includes an uplink BWP on the first cell.

In some examples of the method, apparatuses, and non-transitory computer-readable medium described herein, the first BWP includes a downlink BWP and the second BWP includes a downlink BWP.

Some examples of the method, apparatuses, and non-transitory computer-readable medium described herein may further include operations, features, means, or instructions for receiving control signaling indicating a first cell switch mode for switching between the first cell and the second cell that correspond to a cell group, where retransmitting the feedback message, or determining not to retransmit the feedback message, may be based on the first cell switch mode.

In some examples of the method, apparatuses, and non-transitory computer-readable medium described herein, the transmission of the feedback message, a retransmission of the feedback message, or both, may be scheduled on a secondary cell of the cell group.

In some examples of the method, apparatuses, and non-transitory computer-readable medium described herein, the UE operates according to a first cell switch mode that does not support switching for the first cell a cell group and retransmitting the feedback message, or determining not to retransmit the feedback message, may be based on the first cell switch mode.

A method for wireless communications at a network entity is described. The method may include transmitting control signaling to perform a cell switch between a first cell and a second cell of a cell group, transmitting a downlink data message during a first time interval that occurs prior to a BWP switch from a first BWP to a second BWP on one of the first cell or the second cell, where a second time interval after the first time interval is allocated for a feedback message associated with the downlink data message, and receiving the feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

An apparatus for wireless communications at a network entity is described. The apparatus may include a processor, memory coupled with the processor, and instructions stored in the memory. The instructions may be executable by the processor to cause the apparatus to transmit control signaling to perform a cell switch between a first cell and a second cell of a cell group, transmit a downlink data message during a first time interval that occurs prior to a BWP switch from a first BWP to a second BWP on one of the first cell or the second cell, where a second time interval after the first time interval is allocated for a feedback message associated with the downlink data message, and receive the feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

Another apparatus for wireless communications at a network entity is described. The apparatus may include means for transmitting control signaling to perform a cell switch between a first cell and a second cell of a cell group, means for transmitting a downlink data message during a first time interval that occurs prior to a BWP switch from a first BWP to a second BWP on one of the first cell or the second cell, where a second time interval after the first time interval is allocated for a feedback message associated with the downlink data message, and means for receiving the feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

A non-transitory computer-readable medium storing code for wireless communications at a network entity is described. The code may include instructions executable by a processor to transmit control signaling to perform a cell switch between a first cell and a second cell of a cell group, transmit a downlink data message during a first time interval that occurs prior to a BWP switch from a first BWP to a second BWP on one of the first cell or the second cell, where a second time interval after the first time interval is allocated for a feedback message associated with the downlink data message, and receive the feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission.

Some examples of the method, apparatuses, and non-transitory computer-readable medium described herein may further include operations, features, means, or instructions for transmit control RRC signaling indicating that the cell switch may be based on a semi-static cell switching mode, where the feedback scheme indicates to exclude or include the feedback information corresponding to the downlink data message based on the semi-static cell switching mode.

Some examples of the method, apparatuses, and non-transitory computer-readable medium described herein may further include operations, features, means, or instructions for perform the BWP switch from the first BWP to the second BWP on the first cell that may be a primary cell, where the feedback scheme indicates to exclude the feedback information corresponding to the downlink data message based on performing the BWP switch on the primary cell.

In some examples of the method, apparatuses, and non-transitory computer-readable medium described herein, receiving the feedback message may include operations, features, means, or instructions for receiving the feedback message on the second cell, where the first cell includes a primary cell and the second cell includes a secondary cell, and where the feedback scheme indicates to exclude the feedback information corresponding to the downlink data message based on performing the BWP switch on the second cell and the feedback message being receiving on the second cell.

In some examples of the method, apparatuses, and non-transitory computer-readable medium described herein, receiving the feedback message may include operations, features, means, or instructions for receiving the feedback message on the first cell, where the first cell includes a primary cell and the second cell includes a secondary cell, and where the feedback scheme indicates to include the feedback information corresponding to the downlink data message based on performing the BWP switch on the second cell and the feedback message being receiving on the first cell.

Some examples of the method, apparatuses, and non-transitory computer-readable medium described herein may further include operations, features, means, or instructions for transmitting control signaling indicating that the cell switch may be based on a dynamic cell switching mode, where the feedback scheme indicates to exclude or include the feedback information corresponding to the downlink data message based on the dynamic cell switching mode.

In some examples of the method, apparatuses, and non-transitory computer-readable medium described herein, the feedback scheme indicates to exclude the feedback information corresponding to the downlink data message based on performing the BWP switch on the cell on which the feedback message may be scheduled.

A method for wireless communications at a network entity is described. The method may include transmitting one or more downlink data messages, the one or more downlink data messages associated with a first time interval allocated for a feedback message associated with the one or more downlink data messages from a UE on a first cell, performing a BWP switch from a first BWP to a second BWP on the first cell prior to a second time interval that occurs after the first time interval, transmitting DCI triggering a retransmission of the feedback message, and receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

An apparatus for wireless communications at a network entity is described. The apparatus may include a processor, memory coupled with the processor, and instructions stored in the memory. The instructions may be executable by the processor to cause the apparatus to transmit one or more downlink data messages, the one or more downlink data messages associated with a first time interval allocated for a feedback message associated with the one or more downlink data messages from a UE on a first cell, perform a BWP switch from a first BWP to a second BWP on the first cell prior to a second time interval that occurs after the first time interval, transmit DCI triggering a retransmission of the feedback message, and receive, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

Another apparatus for wireless communications at a network entity is described. The apparatus may include means for transmitting one or more downlink data messages, the one or more downlink data messages associated with a first time interval allocated for a feedback message associated with the one or more downlink data messages from a UE on a first cell, means for performing a BWP switch from a first BWP to a second BWP on the first cell prior to a second time interval that occurs after the first time interval, means for transmitting DCI triggering a retransmission of the feedback message, and means for receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

A non-transitory computer-readable medium storing code for wireless communications at a network entity is described. The code may include instructions executable by a processor to transmit one or more downlink data messages, the one or more downlink data messages associated with a first time interval allocated for a feedback message associated with the one or more downlink data messages from a UE on a first cell, perform a BWP switch from a first BWP to a second BWP on the first cell prior to a second time interval that occurs after the first time interval, transmit DCI triggering a retransmission of the feedback message, and receive, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

Some examples of the method, apparatuses, and non-transitory computer-readable medium described herein may further include operations, features, means, or instructions for determining not to monitor for, or failing to receive, the feedback message during the second time interval in accordance with the feedback retransmission scheme indicating an error case based on one or more of whether cell switching may be configured for the first cell, on which of the first cell or a second cell switching from the first BWP to the second BWP occurs, or on which of the first cell or second cell the retransmission of the feedback message may be scheduled.

Some examples of the method, apparatuses, and non-transitory computer-readable medium described herein may further include operations, features, means, or instructions for determining not to monitor for, or failing to receive, the feedback message during the second time interval in accordance with the feedback retransmission scheme indicating to skip retransmission of the feedback message based on one or more of whether cell switching may be configured for the first cell, on which of the first cell or a second cell switching from the first BWP to the second BWP occurs, or on which of the first cell or second cell the retransmission of the feedback message may be scheduled.

DETAILED DESCRIPTION

Figure 1:
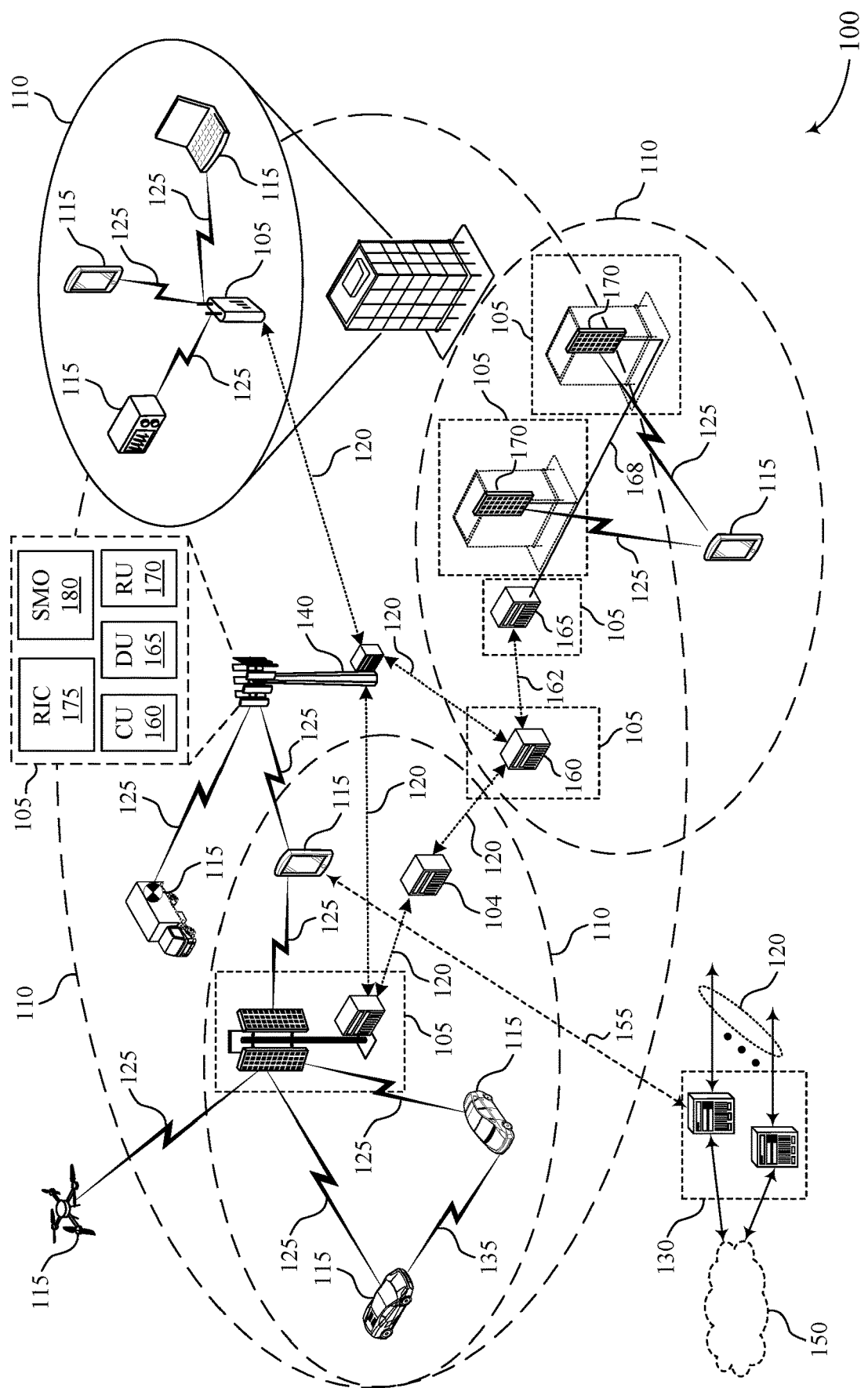
FIG. 1 illustrates an example of a wireless communications system that supports feedback codebook construction for control channel carrier switching in accordance with one or more aspects of the present disclosure.

In some wireless communications systems, user equipments (UEs) may support physical uplink control channel (PUCCH) cell switching, and bandwidth part (BWP) switching within one or more cells. A UE may be configured to semi-statically switch between cells, or may be dynamically triggered to switch between cells. The UE may receive one or more downlink messages, and may generate a feedback message (e.g., a hybrid automatic repeat request (HARQ) acknowledgement (ACK) or negative acknowledgement (NACK) message) for the one or more downlink messages. However, feedback codebooks may be based on BWPs (e.g., subcarrier spacing, which determines slot durations, offsets between downlink signaling and feedback signaling, slot or subplot configuration, feedback priority, etc., may all be based on which BWP is active). Therefore, it may not be clear what to include in, or when to transmit, feedback signaling after a BWP switch for a UE that may be configured to perform cell switching.

A UE may generate feedback messages according to a feedback codebook according to a feedback scheme indicating whether the UE is to include, or exclude, feedback information for physical downlink shared channels (PDSCHs) occurring prior to a BWP switch. For example, the UE may determine whether to include feedback information for any PDSCHs that occur prior to an uplink BWP switch for a UE that supports cell switching based on one or more rules or conditions. For instance, the UE may determine whether to include such feedback information in a feedback message based on the cell in which the uplink BWP switch occurs, the cell in which the feedback message is scheduled for transmission (e.g., the same cell in which the PDSCHs occur, or a different cell), a mode of PUCCH cell switching (e.g., dynamic or semi-static), or any combination thereof. Such rules may be included in one or more standards, and by making such determinations based on the rules, the UE may clearly determine what to include in, and when to transmit, feedback signaling after the BWp switch for the UE configured to perform cell switching.

In some examples, the UE may support retransmission of feedback signaling (e.g., in the case of dropped feedback signaling). In such examples, the UE may transmit, or refrain from transmitting, the retransmission of the feedback message based on one or more rules or conditions, where a BWP switch occurs prior to the retransmission. For example, if one or more conditions are satisfied (e.g., if the UE is not instructed to perform PUCCH cell switching, if the UE is triggered to perform PUCCH cell switching but there is an uplink BWP switch on one of the two cells, or if downlink BWP switching occurs on any configured downlink serving cell), then the UE may either treat the triggered retransmission as an error or ignore the trigger and refrain from transmitting the retransmission, or may send the retransmission of the feedback message according to the timing of the second BWP.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to feedback codebook construction for control channel carrier switching.

FIG. 1 illustrates an example of a wireless communications system 100 that supports feedback codebook construction for control channel carrier switching in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support feedback codebook construction for control channel carrier switching as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may generate feedback messages according to a feedback codebook according to a feedback scheme indicating whether the UE 115 is to include, or exclude, feedback information for physical downlink shared channels (PDSCHs) occurring prior to a BWP switch. For example, the UE 115 may determine whether to include feedback information for any PDSCHs that occur prior to an uplink BWP switch for a UE that supports cell switching based on the cell in which the uplink BWP switch occurs, the cell in which the feedback message is scheduled for transmission (e.g., the same cell in which the PDSCHs occur, or a different cell), and a mode of PUCCH cell switching (e.g., dynamic or semi-static).

In some examples, the UE 115 may support retransmission of feedback signaling (e.g., in the case of dropped feedback signaling). In such examples, the UE 115 may transmit, or refrain from transmitting, the retransmission of the feedback message based on one or more rules or conditions, where a BWP switch occurs prior to the retransmission. For example, if one or more conditions are satisfied (e.g., if the UE 115 115 is not instructed to perform PUCCH cell switching, if the UE 115 is triggered to perform PUCCH cell switching but there is an uplink BWP switch on one of the two cells, or if downlink BWP switching occurs on any configured downlink serving cell), then the UE 115 may either treat the triggered retransmission as an error or ignore the trigger and refrain from transmitting the retransmission, or may send the retransmission of the feedback message according to the timing of the second BWP.

Figure 2:
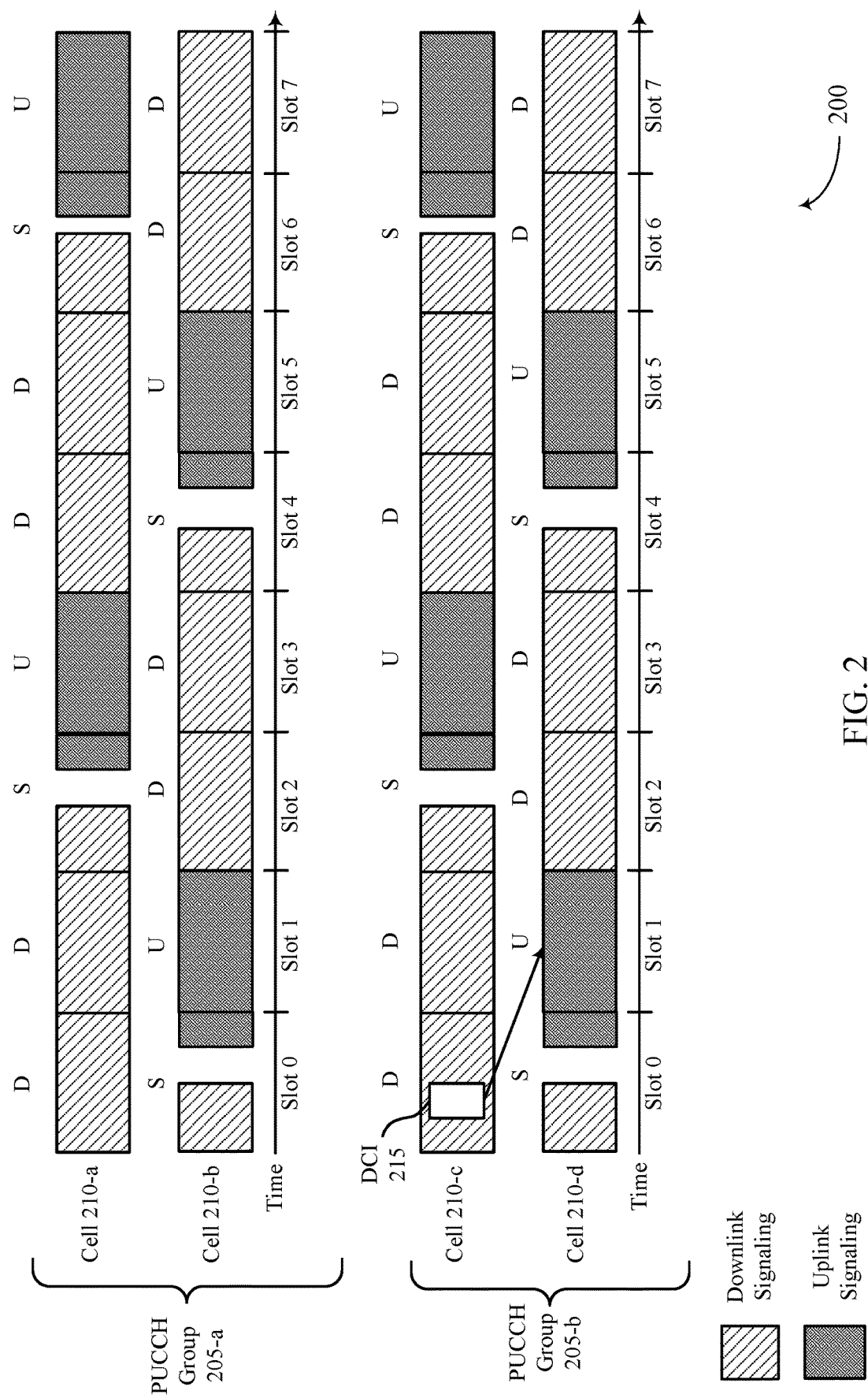
FIG. 2 illustrates an example of a timeline that supports feedback codebook construction for control channel carrier switching in accordance with one or more aspects of the present disclosure.

FIG. 2 illustrates an example of a timeline 200 that supports feedback codebook construction for control channel carrier switching in accordance with one or more aspects of the present disclosure. As described herein, control channel carrier switching may also be referred to as control channel cell switching. Timeline 200 may implement, or be implemented by, aspects of wireless communications system 100. For example, a UE and a network entity, which may be examples of corresponding devices described with reference to FIG. 1, may communicate with each other according to timeline 200. Each cell may be associated with a pattern of uplink (U), downlink (D), and flexible or special (S) time intervals (e.g., slots).

In some examples, a UE may support uplink control signaling (e.g., via a PUCCH) via a cell group. In some examples, such a cell group may be referred to as a PUCCH group 205. A PUCCH group 205 may include a single cell that can be used for transmitting PUCCH signaling (e.g., a primary cell (PCell) in a master cell group (MCG) or a primary secondary cell (PSCell) in a secondary cell group (SCG)). However, in some examples, the UE may support PUCCH carrier switching. In such examples, the UE may be able to use up to two cells 210 in a PUCCH group for transmitting uplink control signaling via a PUCCH (e.g., one of the uplink cells is a PCell or a PSCell, and the other cell may be a secondary cell (SCell)). In some examples, the SCell used to transmit PUCCH signaling may be known as a PUCCH cell or PUCCH SCell. For example, the PUCCH group 205-a may include a cell 210-a (e.g., a PCell in in an MCG, or a PSCell in an SCG), and a cell 210-b (e.g., an SCell, which may be referred to as a PUCCH cell). A UE that supports cell switching may support one or more modes of operation. For example, the UE may perform cell switching for signaling via a PUCCH according to a semi-static pattern (e.g., semi-static indications of PUCCH cell switching), or dynamic cell switching for signaling via a PUCCH via a DCI indication.

In some examples, the UE may support semi-static cell switching via PUCCH group 205-a. The cell 210-a may be a PCell in an MCG or a PSCell in an SCG, and the cell 210-b may be an SCell, or may be referred to as a PUCCH SCell. The network entity may indicate (e.g., via higher layer signaling such as radio resource control (RRC) signaling) a semi-static switching pattern to the UE. That is, the network entity may configure a periodic time pattern, which indicates the corresponding target cell for PUCCH transmissions for each time interval (e.g., slot) of a set of time intervals within the periodicity. The time pattern may be configured with reference to a PCell numerology, and with a bit sequence. For example, a 0 may indicate a PCell, and a 1 may indicate a PUCCH SCell. The bit sequence may therefore indicate, during which time intervals (e.g., according to the numerology of the cell 210-a) the UE may support uplink signaling including PUCCH signaling. For instance, the pattern may indicate a pattern of slots for uplink signaling, such as [SCell, SCell, PCell, PCell], and the pattern may repeat over time. In such examples, the UE may transmit uplink control signaling during a portion of slot 0 and during slot 1 on cell 210-b, during a portion of slot 2 and during slot 3 on cell 210-a, during a portion of slot 4 and during slot 5 on cell 210-a, and during a portion of slot 6 and during slot 7 on cell 210-a. PUCCH resources for transmitting uplink control information (UCI) may be interpreted based on the PUCCH resources configured on the target PUCCH cell 210-b. An offset (e.g., K1) between received data signaling (e.g., via one or more PDSCHs) and resources for dynamically scheduled feedback signaling (e.g., HARQ-ACK), or for semi-persistent scheduled (SPS) feedback signaling may be interpreted based on a numerology of the cell 210-a. PUCCH resource indicators (PRIs) may be interpreted based on the PUCCH resources configuration on the target cell 210-b.

In some examples, the UE may support dynamic indications of cell switching via PUCCH group 205-b. The cell 210-c may be a PCell in an MCG or a PSCell in an SCG, and the cell 210-d may be an SCell, or may be referred to as a PUCCH SCell. The network entity may dynamically indicate (e.g., via one bit in a DCI message) a target cell (e.g. the cell 210-d) for PUCCH transmissions (e.g., may indicate a selection between the cell 210-a and the cell 210-b) for PUCCH transmissions. For example, a DCI format associated with generation of feedback information (e.g., HARQ-ACK information) by the UE may include a PUCCH cell indicator field, with a value of 0, or 1 indicating, respectively, whether a PUCCH transmission with the HARQ-ACK information by the UE s on a PCell (e.g., cell 210-c) or a PUCCH-sSCell (e.g., the cell 210-d). An offset (e.g., K1) indicating an offset between a PDSCH carrying a data message and resources for transmitting feedback information (e.g., a PDSCH to HARQ-ACK offset) may be interpreted based on the target PUCCH cell (e.g., based on the numerology of the cell 210-d). PRI may be interpreted based on PUCCH resources configuration on the target cell (e.g., the cell 210-d). Thus, interpretation of a PDSCH to HARQ-ACK offset, or other information may be interpreted differently based on whether a UE is configured for dynamic PUCCH cell switching or semi-static PUCCH cell switching.

In some examples, each uplink serving cell may be configured with multiple uplink BWPs, and uplink communications between the UE and the network entity may switch from one uplink BWP to another UL BWP. PUCCH communications (e.g., HARQ-ACK feedback) parameters may be configured per uplink BWP. For example, subcarrier spacing for an uplink BWP (e.g., which may determine uplink slot duration), sets of K1 values (e.g., slot offsets between PDSCH reception and HARQ-ACK feedback), slots or subslot configurations for HARQ-ACK feedback, a number of HARQ-ACK priority levels (e.g., two HARQ-ACK priorities or one HARQ-ACK priority) may be based on the BWP (e.g., of multiple available BWPs) on which a UE is currently or was most recently communicating.

A UE may be configured to transmit feedback signaling, for one or more received data messages, in a feedback message. The UE may generate feedback information according to a feedback codebook indicating feedback information or each of a set of one or more received data messages. However a feedback codebook may be complicated by a BWP switch, a cell switch or both. For example, if the UE switches BWP parts, then it may not be able to clearly identify or indicate feedback information for data messages that occur prior to a BWP switch (e.g., because slot durations, slot offsets, feedback priority levels, etc., may have changed due to the BWP switch). Further, due to the cell switching, a BWP switch may or may not occur on a same cell on which a feedback transmission is scheduled. The information available to the UE, and its capability to generate a feedback codebook for PDSCHs that occur prior to a BWP switch, may be further dependent upon whether cell switching is semi-static or dynamic. As described herein, a BWP switch may also be referred to as a BWP change.

Techniques described herein may support generation of feedback codebooks and rules or conditions defining such feedback codebooks in cases of cell switching and BWP switching.

Figure 3:
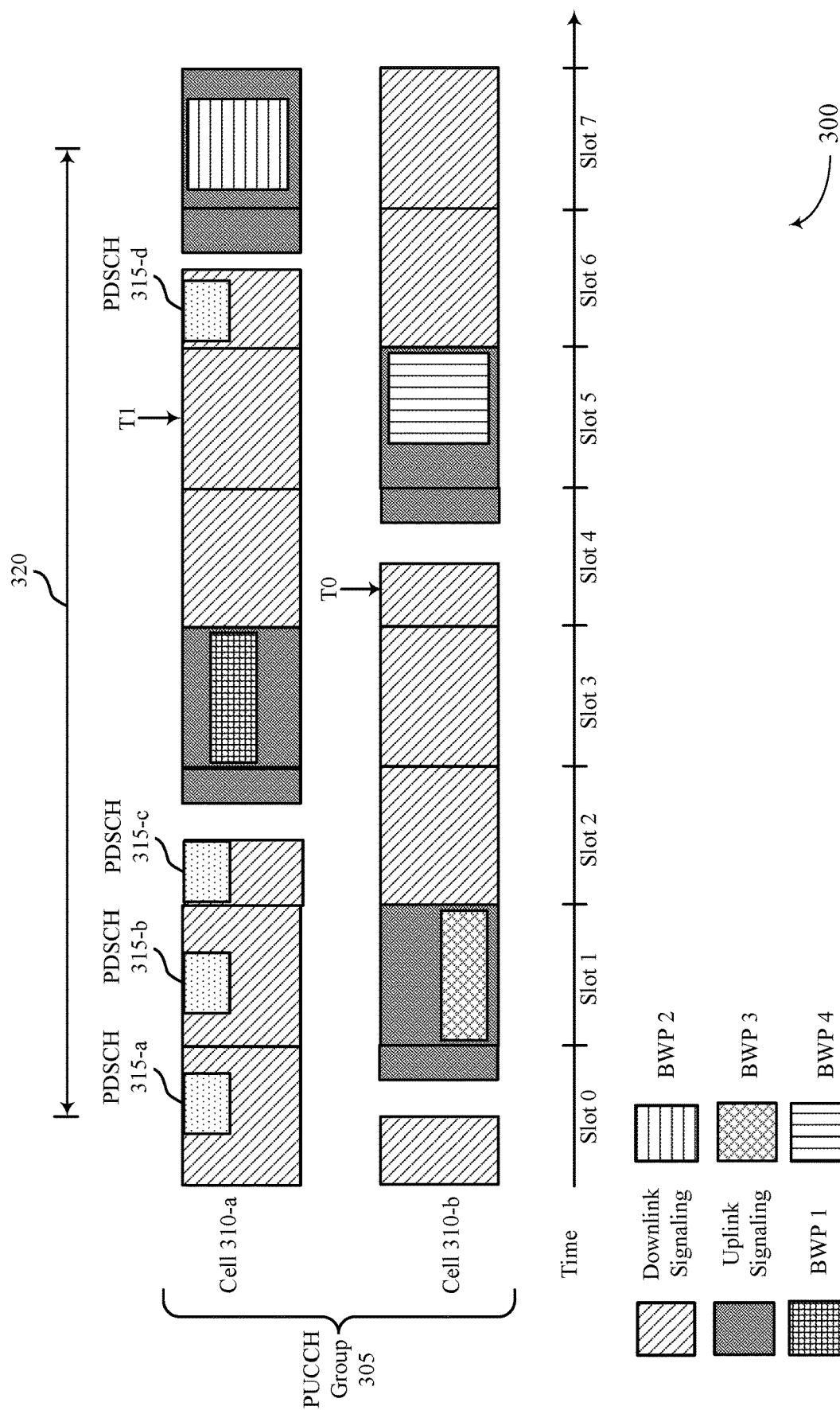
FIG. 3 illustrates an example of a timeline that supports feedback codebook construction for control channel carrier switching in accordance with one or more aspects of the present disclosure.

FIG. 3 illustrates an example of a timeline 300 that supports feedback codebook construction for control channel carrier switching in accordance with one or more aspects of the present disclosure. Timeline 300 may implement, or be implemented by, aspects of wireless communications system 100. For example, a UE and a network entity, which may be examples of corresponding devices described with reference to FIG. 1 and FIG. 2, may communicate with each other according to timeline 300. The UE may be configured with a PUCCH group 305, and each cell 310 may be associated with a pattern of uplink (U), downlink (D), and flexible or special (S) time intervals (e.g., slots). As described with reference to FIG. 2, the PUCCH group 305 may be an MCG, in which case the cell 310-a may be a PCell and the cell 310-b may be an SCell. In some examples, the PUCCH group 305 may be an SCG, in which case the cell 310-a may be a PSCell, and the cell 310-b may be an SCell.

The UE may receive data signaling (e.g., from the network entity), via one or more PDSCHs 315. The UE may also be configured to perform cell switching within the PUCCH group 305, as described in greater detail with reference to FIG. 2. In some examples, the UE may also perform a BWP switch (e.g., an active uplink BWP switch). In such examples, the UE may determine whether to include feedback information associated with PDSCHs received prior to an uplink BWP switch in a feedback codebook (e.g., where the UE is configured with PUCCH cell switching) according to a feedback scheme based on one or more of: the cell in which the uplink BWP switch occurs, the cell in which the feedback message is scheduled for transmission, the mode of PUCCH cell switching (e.g., dynamic cell switching or semi-static cell switching), or any combination thereof. For example, if the UE determines not to include feedback information for the PDSCH 315-a in the feedback message. However, the UE may include, in the codebook of the feedback message, feedback information for the PDSCH 315-d (e.g., which occurs after the BWP change at T0 on the cell 310-b or T1 on the cell 310-a).

In some examples, the UE may be configured with semi-static cell switching. For instance, in such examples, the UE may receive data signaling via PDSCH 315-a in slot 0, PDSCH 315-b in slot 1, PDSCH 315-c, and PDSCH 315-d in slot 6. A feedback message may be scheduled for one or more PDSCHs received during time period 320 (e.g., the offset K1 between receiving a PDSCH 315-a and transmitting a feedback message may be 7). The UE may perform a BWP switch (e.g., from BWP 1 to BWP 2 on cell 310-a, or from BWP 3 to BWP 4 on cell 310-b). For a PDSCH scheduled in slot n (e.g., PDSCH 315-a in slot 0) with a corresponding feedback message scheduled in slot n+K1 (e.g., slot 7), if there is a BWP switch (e.g., an active BWP switch) on the PCell (e.g., from BWP 1 to BWP on cell 310-a) that occurs after slot n (e.g., the UE performs the BWP switch at time T1), then the UE may not include feedback information corresponding to the PDSCH 315-a in the feedback message transmitted in slot 7 (e.g., regardless of whether the feedback transmission occurs on the PCell or the SCell). In such examples, for any PDSCH 315 received prior to a BWP switch (e.g., PDSCH 315-a, PDSCH 315-b, PDSCH 315-c), the UE may refrain from including feedback information in the feedback codebook for the feedback message if a BWP switch occurs on the PCell (e.g., if the feedback transmission is scheduled on the PCell or if the feedback transmission is scheduled on the SCell). Such techniques may apply for semi-static configured cell switching or dynamic scheduled cell switching. In some examples, the UE may drop the feedback information as long as there is an uplink BWP switch that occurs on the PCell, regardless of the target PUCCH cell. In some examples, the UE may perform different dropping rules for BWP switching on the PCell and BWP switching in the PUCCH SCell.

In some examples, the UE may determine whether to include feedback information for PDSCHs 315 received prior to a BWP switch in a feedback codebook based on whether the BWP switch occurs on the SCell (e.g., the cell 310-b), and whether the feedback transmission is scheduled on the SCell. For instance, the UE may be configured with semi-static PUCCH cell switching. For a PDSCH 315-a scheduled in slot n (e.g., slot 0) with a corresponding feedback message scheduled in slot n+K1 (e.g., slot 5 if K1=5), if there is an uplink BWP switch on the PUCCH cell (e.g., from BWP 3 to BWP 4 on cell 310-b), then the UE may not include feedback information corresponding to PDSCH 315-a in the feedback transmission in slot 5 if the feedback transmission is scheduled on the cell 310-b. However, if the feedback transmission is scheduled in slot 7 on cell 310-a (e.g., K1=7), then the UE may include feedback information for the PDSCH 315-a in the feedback message (e.g., in the case of a BWP switch at time T0 on the cell 310-b) if the feedback message is scheduled on a different cell (e.g., the cell 310-a) than the cell on which the BWP switch occurred (e.g., the cell 310-b). Such techniques may apply for semi-static configured cell switching or dynamic scheduled cell switching. In some examples, the UE may perform different dropping rules for BWP switching on the PCell and BWP switching in the PUCCH SCell.

In some examples, for semi-static PUCH cell switching, if the BWP switching occurs on the SCell, then the UE may not exclude (e.g., may include) the feedback bits (e.g., HARQ-ACK bits) associated with the PDSCH received prior to the BWP switch. The UE may apply such rules (e.g., may include feedback bits in a feedback codebook for PDSCHs received prior to a BWP switch if the cell switching is semi-static) regardless of whether the PUCCH transmission occurs on the PCell or the SCell.

In some examples, the UE may determine whether to include feedback information for a PDSCH 315 received prior to a BWP switch based on a mode of cell switching (e.g., semi-static cell switching or dynamic cell switching). For example, the UE may be configured with dynamic PUCCH cell switching. For a PDSCH 315-a scheduled in slot n (e.g., slot 0) with a corresponding feedback message scheduled in slot n+K1 (e.g., slot 7), if there is a BWP switch in a cell X (e.g., another cell 310) after slot n and before slot n+K1, then the UE may not include the feedback information corresponding to the PDSCH 315-a in the feedback transmission if the feedback transmission is scheduled on cell X. In other words, whether the UE includes the feedback information corresponding to the PDSCH in the feedback transmission only depends on whether there is an uplink cell switch on a target PUCCH cell (e.g., the cell 310-b) for the PUCCH transmission (e.g., but does not depend on whether there is an uplink cell switch on any other cell 310). In some examples, the UE may determine whether to transmit feedback information based on whether the BWP switch occurs on the PCell or the SCell, whether the feedback message is scheduled on the PCell or the SCell, or both (e.g., if the UE is configured with dynamic scheduled cell switching). In an examples, the UE may drop feedback information from a feedback codebook if the uplink BWP switch occurs on the same cell as the target PUCCH cell (e.g., the cell on which the PUCCH is scheduled).

The UE may determine whether to include feedback information for PDSCHs 315 received prior to a BWP switch in a feedback codebook based on whether the BWP switch occurs on the same cell 310 as the cell 310 on which the feedback message is scheduled. For example, if a BWP switch occurs on the same cell 310 on which the feedback message is scheduled, the UE may exclude feedback information for PDSCHs 315 occurring prior to the BWP switch. If a BWP switch occurs on a different cell 310 from the cell 310 on which the feedback message is scheduled, the UE may include feedback information for PDSCHs 315 occurring prior to the BWP switch.

Rules and conditions described herein may be applied to various scenarios. For example, the UE may drop feedback information from a feedback codebook if the uplink BWP switch occurs on the same cell as the target PUCCH cell (e.g., the cell on which the PUCCH is scheduled). In some examples, the UE may drop the feedback information as long as there is an uplink BWP switch that occurs on the PCell, regardless of the target PUCCH cell. In some aspects, the UE may drop the HARQ-ACK information for a PUSCH received prior to a BWP switch from a feedback codebook if the BWP switch occurs on the PCell, or if the BWP switch occurs on the cell in which the PUCH transmission is scheduled. Such rule may apply regardless of whether the cell switch is dynamic, or semi-static. Such rules may result in a simplified dropping rule (e.g., a unified dropping for both semi-static and dynamic cell switching) such that a UE does not have to support cases in which it is not able to generate some HARQ ACK information due to the occurrence of BWP switching.

The rules and conditions described herein may be applied to various additional scenarios. The UE may perform different dropping rules for BWP switching on the PCell and BWP switching in the PUCCH SCell. In some examples the UE may perform different dropping rules depending on whether dynamic or semi-static cell switching is configured and performed. In some examples, the UE may drop feedback information form the feedback codebook if there is an uplink BWP switch on either the PCell or the SCell. In some examples, the techniques may be performed in various combinations, and signaling from the network entity may indicate which technique the UE is perform, the UE may be preconfigured with which technique to perform, or both.

In some examples, the rules and conditions described herein may apply to various types of codebooks (e.g., may be applicable to both type-1 HARQ-ACK codebook and type-2 HARQ-ACK codebook determination). In some examples, different rules may be applied for different codebook types (e.g., different rules may be applied for type-1 HARQ-ACK codebook determination and type-2 HARQ-ACK codebook determination, respectively). In some examples, the UE may select the appropriate rules for codebook determination based on whether the feedback codebook is for type-1 or type-2 HARQ-ACK feedback (e.g., based on autonomous UE selection, one or more rules or conditions, or an instruction from the network, among other examples).

In some examples, the UE may determine to retransmit, or refrain from sending a retransmission, of a feedback message based on BWP switching, cell switching, or both, as described in greater detail with reference to FIG. 4.

Figure 4:
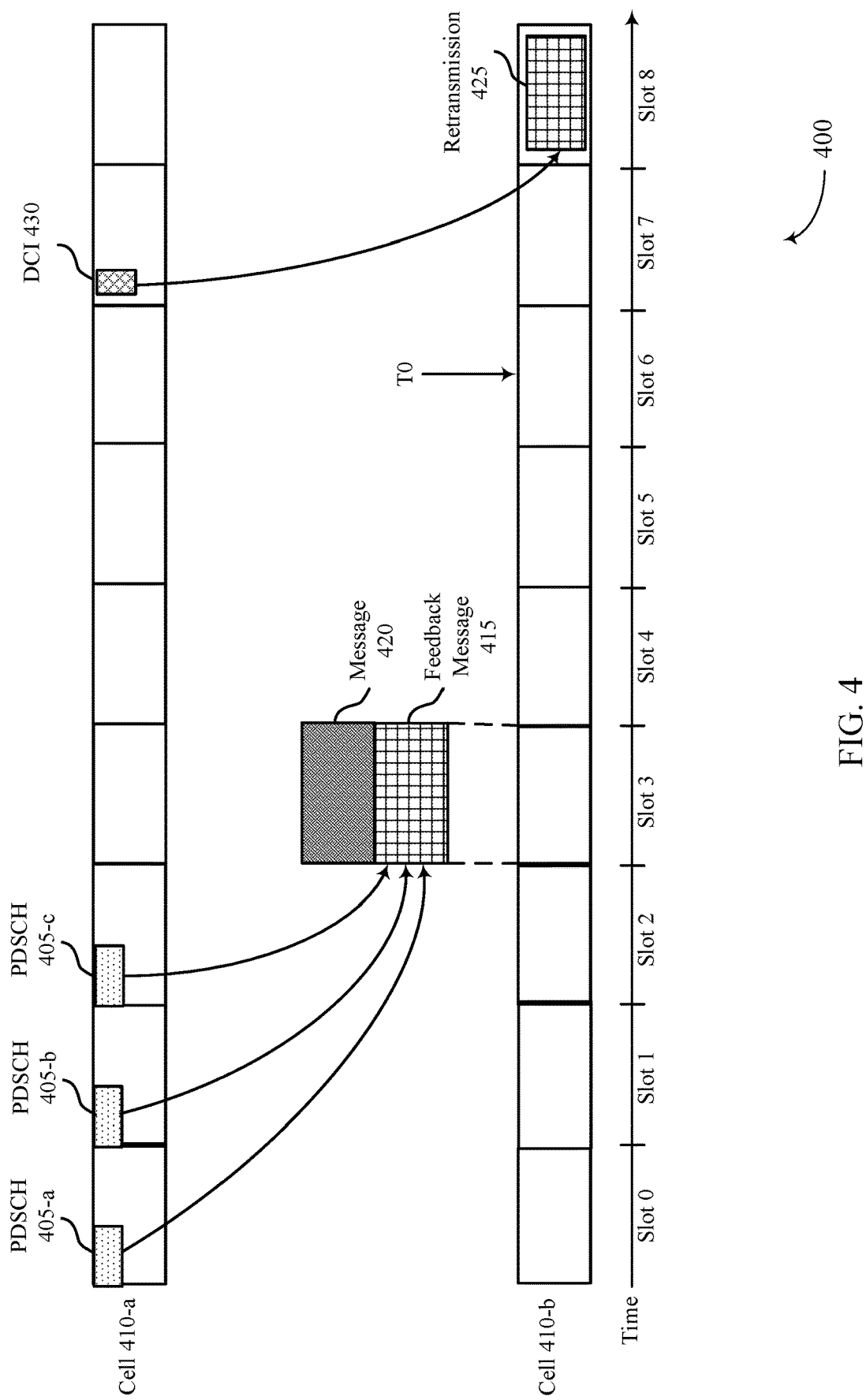
FIG. 4 illustrates an example of a timeline that supports feedback codebook construction for control channel carrier switching in accordance with one or more aspects of the present disclosure.

FIG. 4 illustrates an example of a timeline 400 that supports feedback codebook construction for control channel carrier switching in accordance with one or more aspects of the present disclosure. Timeline 400 may implement, or be implemented by, aspects of wireless communications system 100, or timeline 200, or timeline 300. For example, a UE and a network entity, which may be examples of corresponding devices described with reference to FIGS. 1-3, may communicate with each other according to timeline 400. The UE may be configured with a PUCCH group, and may perform BWP switching, cell switching, or both, as described herein. As described with reference to FIG. 2, the PUCCH group may be an MCG, or an SCG. In some examples, the cell 410-a may be a downlink serving cell, and the cell 410-b may be a PUCCH SCell, or a PUCCH carrier.

The UE may be configured to receive downlink signaling via one or more PDSCHs 405 (e.g., the PDSCH 405-a, the PDSCH 405-b, and the PDSCH 405-c, on cell 410-a). The PDSCHs 405 maybe associated with a feedback message 415 (e.g., the UE may generate a feedback codebook for the feedback message 415 including feedback information for each of the PDSCHs 405). In some examples, however, the UE may not transmit (e.g., or the network entity may not receive) the feedback message 415. For example, the UE may drop transmission of a feedback message 415 in slot 3 due to a conflict (e.g., with a semi-static downlink symbol) or due to overlapping with a higher priority transmission (e.g., a message 420 having higher priority than a low priority associated with the feedback message 415). For example, a high priority PUCCH or PUSCH may overlap with a low priority PUCCH allocated for transmitting the feedback message 415. If the UE is not configured to multiplex the lower priority feedback message 415 with the higher priority message 420, then the UE may drop the feedback message 415 (e.g., may refrain from transmitting the feedback message 415). In such examples, the UE may perform a HARQ-ACK codebook retransmission.

The network entity may transmit a DCI 430 (e.g., a DCI format 1_1 or a DCI format 1_2) to trigger the UE to retransmit the feedback codebook that was dropped or canceled. For example, the UE may receive the DCI 430 in slot n (e.g., slot 6), which may trigger the UE to retransmit the feedback message 415 dropped in slot m=n−L (e.g., slot 3, where L=4) in slot n+k (e.g., slot 8 where k=1). The DCI 430 may indicate values for L and k. One shot HARQ ACK retransmissions may be configured jointly with semi-static PUCCH cell switching.

In some examples, the UE may perform a BWP switch. For example, the UE may switch from a first BWP to a second BWP during slot 6 (e.g., at time T0). The UE may determine whether to retransmit the feedback message 415, as triggered by the DCI 430, based on whether one or more conditions are satisfied. For example, if the UE is scheduled to retransmit the feedback message 415 in slot n+k (e.g., slot 8) (e.g., according to the feedback codebook generated in slot n−L), then the UE may retransmit the feedback message or refrain from retransmitting the feedback message according to a feedback retransmission scheme if one or more of the following conditions are satisfied: if the UE is not configured with PUCCH cell switching and there is an uplink BWP switch on a PCell; if the UE is configured with PUCCH cell switching and there is an uplink BWP switch on the PCell; if the UE is configured with PUCCH cell switching and there is an uplink BWP switch on the SCell and either the original feedback codebook is scheduled on the SCell or the retransmitted feedback message is scheduled on the SCell; if there is a downlink BWP switch on any of the configured downlink serving cells (e.g., such as cell 410-a), or any combination thereof. In some examples, the UE may determine whether to retransmit a feedback message based on conditions or rules based on the ordering of the DCI 430 and the BWP switch (e.g., based on whether the UE receives the DCI 430 prior to or after the BWP switch). As such, procedures described herein (e.g., retransmitting the feedback message, dropping the retransmission of the feedback message, or treating the retransmission of the feedback message as an error case) may be based on the ordering of the BWP switch and the reception of the DCI 430.

If any of the described conditions are satisfied (e.g., according to one or more rules), then the UE may take one of the following actions. In some examples, if the conditions are satisfied, the UE may treat the triggered retransmission as an error case. In such examples, the UE may not expect the network entity to schedule the feedback retransmission during or after an uplink or downlink BWP switch, and may ignore such a trigger (e.g., or the network entity may refrain from triggering the retransmission 425 if a BWP switch occurs during or prior to the scheduled BWP switch). In some examples, if the conditions are satisfied, the UE may refrain from retransmitting the feedback codebook (e.g., refrain from sending the retransmission 425, despite successfully receiving the DCI 430). In cases where the UE treats the retransmission 425 as an error case, or simply refrains from sending the retransmission 425, ambiguity in determining slot n−L may arise resulting from the BWP switch. Treating the triggered retransmission as an error may include discarding the DCI 430. That is, the UE may treat the DCI 430 as an error, the UE may treat the DCI as including inconsistent information, or the UE may discard all information in the DCI format (e.g., other than information related to HARQ-ACK retransmission). Treating the retransmission 425 as an error case, or refraining from sending the retransmission 425, may avoid the complications resulting from such ambiguity.

In some examples, if the conditions are satisfied, then the UE may follow the units of the PUCCH slot duration after the BWP switch according to the PUCCH slot duration of the target uplink BWP to determine the feedback codebook to be retransmitted. In some cases, a time interval duration (e.g., slot length) after a BWP switch may be longer than the time interval duration (e.g., slot length) of the prior uplink BWP (e.g. the source uplink BWP). In such examples, the UE may retransmit the feedback codebook that was scheduled in a first uplink slot that overlaps in time with the uplink slot n–L measured by the units of the PUCCH slot of the target uplink BWP.

In some examples, whether the UE drops or transmits a feedback message (e.g., the retransmission 425) may be based on whether the DCI 430 triggering the retransmission 425 occurs before or after the BWP switch (e.g., at T0). If the DCI 430 is received after (e.g., or in the same slot as) the BWP switch, then the UE may send the retransmission 425. If the DCI 430 is received before (e.g., or during the same slot as) the BWP switch, then the UE may refrain from sending the retransmission 425, or treat the retransmission as an error case, or discard all information contained in the DCI, among other examples, as described herein. Thus, the case in which the DCI 430 is received in the same slot as the BWP switch may result in the UE (e.g., autonomously or according to a standardized rule) sending the retransmission 425 or refraining from sending the retransmission 425.

Figure 5:
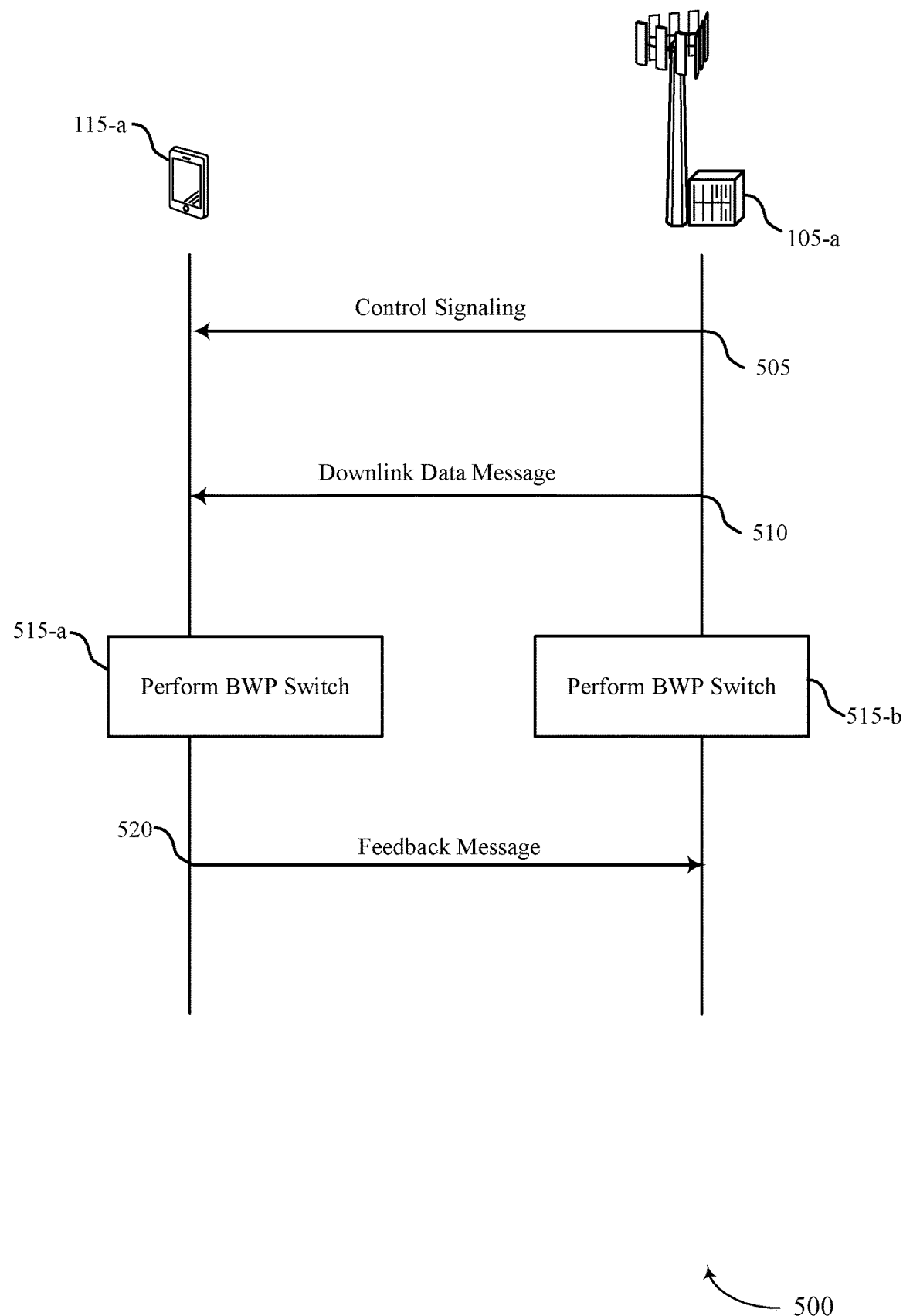
FIG. 5 illustrates an example of a process flow that supports feedback codebook construction for control channel carrier switching in accordance with one or more aspects of the present disclosure.

FIG. 5 illustrates an example of a process flow 500 that supports feedback codebook construction for control channel carrier switching in accordance with one or more aspects of the present disclosure. Process flow 500 may implement aspects of, or be implemented by, wireless communications system 100, timeline 200, timeline 300, or timeline 400. For example, process flow 500 may include a network entity 105-*a* and a UE 115-*a*, which may be examples of corresponding devices described with reference to FIGS. 1-4.

At 505, the UE 115-*a* may receive (e.g., from the network entity 105-*a*), control signaling (e.g., higher layer signaling, such as RRC signaling) to perform a cell switch between a first cell and a second cell of a cell group (e.g., a PCell and an SCell of a MCG, or a PSCell and an SCell of a SCG). The control signaling may configure the UE with PUCCH cell switching. In some examples, the control signaling may be RRC signaling configuring the UE to perform semi-static cell switching. In some examples, the control signaling may include RRC signaling configuring the cell switching, and subsequent DCI signaling triggering dynamic cell switching according to the RRC configuration.

At 510, the UE 115-*a* may receive (e.g., from the network entity 105-*a*), a downlink data message (e.g., via a PDSCH, as described with reference to FIGS. 2-4). The downlink data message may be received in a first time interval (e.g., slot) that occurs prior to a BWP switch. A second time interval (e.g., slot) may occur some quantity of time intervals after the first time interval, and may be allocated for a feedback message associated with the downlink data message.

At 515-*a*, the UE 115-*a* ma perform the BWP switch after the first time interval, and before or during the second time interval. The BWP switch may include switching form a first BWP to a second BWP (e.g., on the first cell or the second cell). Similarly, at 515-*b*, the network entity 105-*a* may perform a BWP switch, to communicate with the UE 115-*a* on a different BWP according to the BWP switch.

At 520, the UE 115-*a* may transmit, and the network entity 105-*a* may receive, a feedback message according to a feedback scheme. The feedback scheme may indicate whether to exclude or include feedback information corresponding to the downlink data message based at least in part on one or more of the cell switch (e.g., whether the UE 115-*a* is configured with semi-static cell switching or dynamic cell switching), the BWP switch (e.g., on which cell the BWP switch occurred), on which of the first cell or the second cell the feedback message is scheduled for transmission, or any combination thereof.

For example, if the BWP switch occurs on the PCell, the feedback scheme may indicate to exclude the feedback information for the downlink data message (e.g., or for any PDSCH occurring prior to the BWP switch) based on performing the BWP switch on the PCell. In some examples, the feedback scheme may indicate to exclude the feedback information for the downlink data message based on performing the BWP switch on the SCell and transmitting the feedback message on the SCell. In some examples, the feedback scheme may indicate to include the feedback information for the downlink message based on performing the BWP switch on the SCell and transmitting the feedback message on the PCell.

In some examples, the feedback scheme may depend on a mode of cell switching (e.g., semi-static or dynamic). For example, the control signaling may indicate a dynamic cell switching mode (e.g., RRC signaling configuring or enabling semi-static switching, and DCI signaling indicating the switching). Based thereon, the UE may exclude feedback information for the downlink data message from the feedback message if the BWP switching occurs on the same cell on which the feedback transmission is scheduled. For example, if the BWP switch is on the PCell and the transmission of the feedback message is scheduled on the PCell, or if both the BWP switch and the transmission of the feedback message are scheduled on the SCell, then the UE 115-*a* may exclude the feedback information from the feedback message. However, if the BWP switch occurs on a different cell from the cell on which the transmission is scheduled, then the UE 115-*a* may include the feedback information for the downlink data message in the feedback message.

Figure 6:
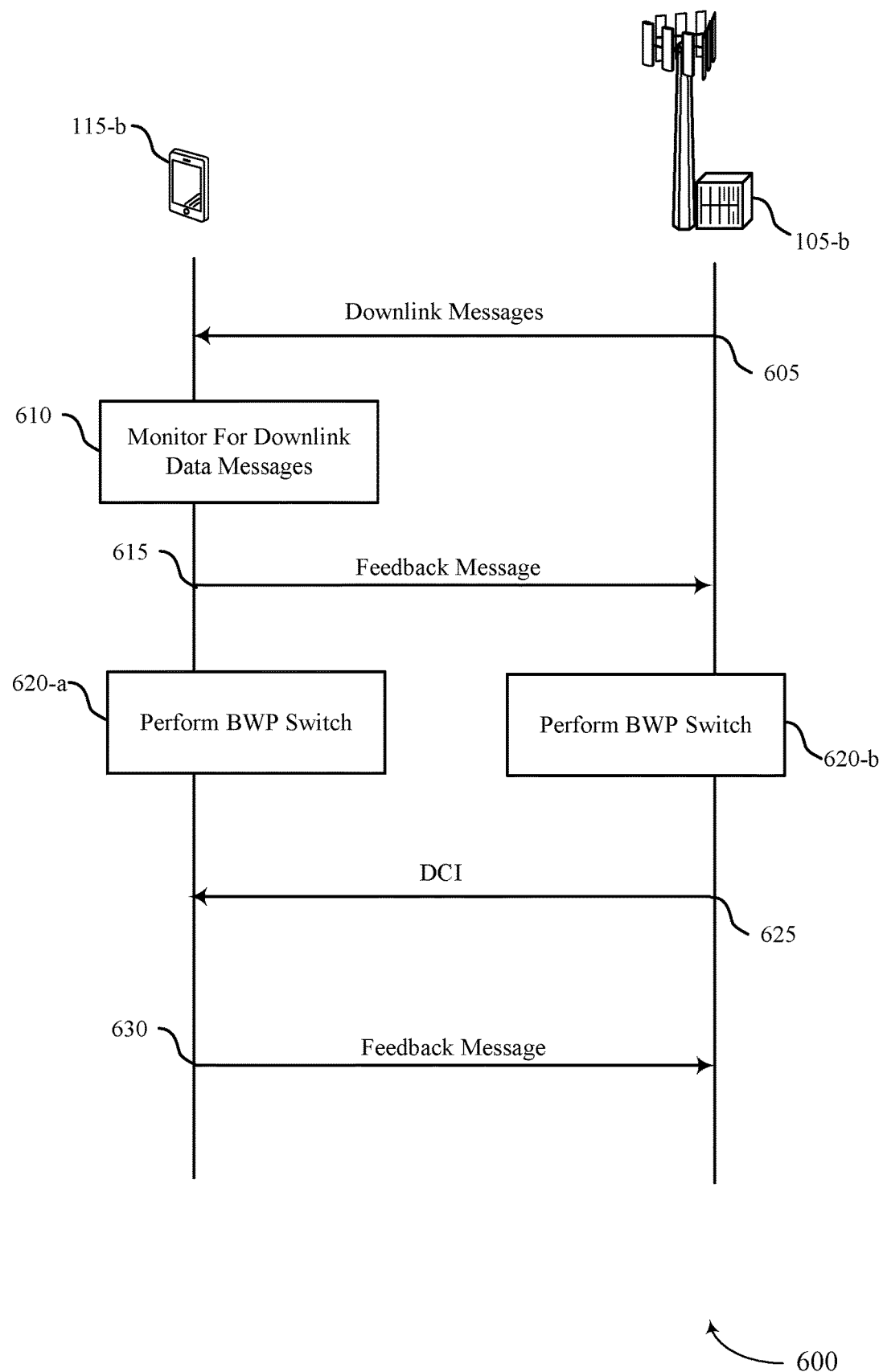
FIG. 6 illustrates an example of a process flow that supports feedback codebook construction for control channel carrier switching in accordance with one or more aspects of the present disclosure.

FIG. 6 illustrates an example of a process flow 600 that supports feedback codebook construction for control channel carrier switching in accordance with one or more aspects of the present disclosure. Process flow 600 may implement aspects of, or be implemented by, wireless communications system 100, timeline 200, timeline 300, timeline 400, and process flow 500. For example, process flow 600 may include a network entity 105-*b* and a UE 115-*b*, which may be examples of corresponding devices described with reference to FIGS. 1-5.

At 605, the network entity 105-*b* may transmit one or more downlink messages. At 610, the UE 115-*b* may monitor for one or more downlink messages (e.g., from the network entity 105-*b*). The one or more downlink messages may be associated with a first time interval allocated for transmission of a feedback message associated with the one or more downlink data messages on a first cell (e.g., the feedback message may be scheduled on a first cell, such as a PUCCH SCell). However, in some examples, as described in greater detail with reference to FIG. 5, the UE 115-*b* may refrain from transmitting the feedback message at 615 (e.g., due to higher priority signaling), or the network entity 105-*b* may fail to receive the feedback message.

At 620-*a*, the UE 115-*b* may perform a BWP switch from a first BWP to a second BWP on the first cell before a second time interval that occurs after the first time interval. Similarly, the network entity 105-*b* may perform a BWP switch at 620-*b*.

At 625, the UE 115-*b* may receive a DCI message triggering a retransmission of the feedback message. The UE 115-*b* may receive (e.g., via control signaling such as the DCI, or another control message) an indication of a timing offset between the first time interval allocated for the transmission of the feedback message and a third time interval in which the DCI triggering the retransmission of the feedback message is received. In such examples, the UE 115-*b* may retransmit the feedback message on the second BWP, and may determine to do so based at least in part on the timing offset according to a time interval duration associated with the second BWP. For example, the DCI may include an indication of a time offset between the first time interval (e.g., the time interval for transmission of the feedback message) and the time interval in which the DCI triggering the retransmission is received.

At 630, the UE 115-*b* may retransmit, or determine not to retransmit, the feedback message during the second time interval, in accordance with a feedback retransmission scheme. The feedback retransmission scheme may indicate whether to retransmit or skip retransmission of the feedback message based at least in part on one or more of whether cell switching is configured for the first cell, or the BWP switch, or on which of the first cell or a second cell retransmission of the feedback message is scheduled.

In some examples, the UE 115-*b* may determine not to retransmit the feedback message during the second time interval in accordance with the feedback retransmission scheme indicating an error case based at least in part on one or more of whether cell switching is configured for the first cell, on which of the first cell or a second cell switching from the first BWP to the second BWP occurs, or on which of the first cell or second cell the retransmission of the feedback message is scheduled For example, the UE 115-*b* may determine not to retransmit the feedback message during the second time interval in accordance with the feedback retransmission scheme indicating to skip the retransmission based at least in part on one or more of whether cell switching is configured for the first cell, on which of the first cell or a second cell switching from the first BWP to the second BWP occurs, or on which of the first cell or second cell the retransmission of the feedback message is scheduled.

In some examples, the UE 115-*b* may determine whether to retransmit the feedback message or skip the feedback message in accordance with the feedback retransmission scheme based at least in part on whether receiving the DCI occurs before or after performing the BWP switch.

In some examples, the UE 115-*b* may retransmit the feedback message in a first time interval (e.g., first slot) on the second BWP (e.g., the SCell) that overlaps in time with an uplink time interval of the first BWP (e.g., the second uplink time interval of the first BWP occurring after the time offset). For example, the UE 115-*b* may retransmit the HARQ-ACK codebook in a first uplink slot overlapping with the UL slot n–L measured by the units of a PUCCH slot of the target uplink BWP (e.g., the PUCCH SCell).

The UE 115-*b* may determine whether to retransmit the feedback message at 630 based on one or more conditions being satisfied. For example, the UE 115-*b* may retransmit or skip retransmission at 630 based on the first BWP being an uplink BWP on the first cell and the second BWP being an uplink BWP on the first cell, or based on the first BWP being a downlink BWP and the second BWP being a downlink BWP, based on control signaling indicating a first cell switch mode (e.g., configuring cell switching) or the UE 115-*b* not supporting (e.g., or not being configured for) cell switching.

Figure 7:
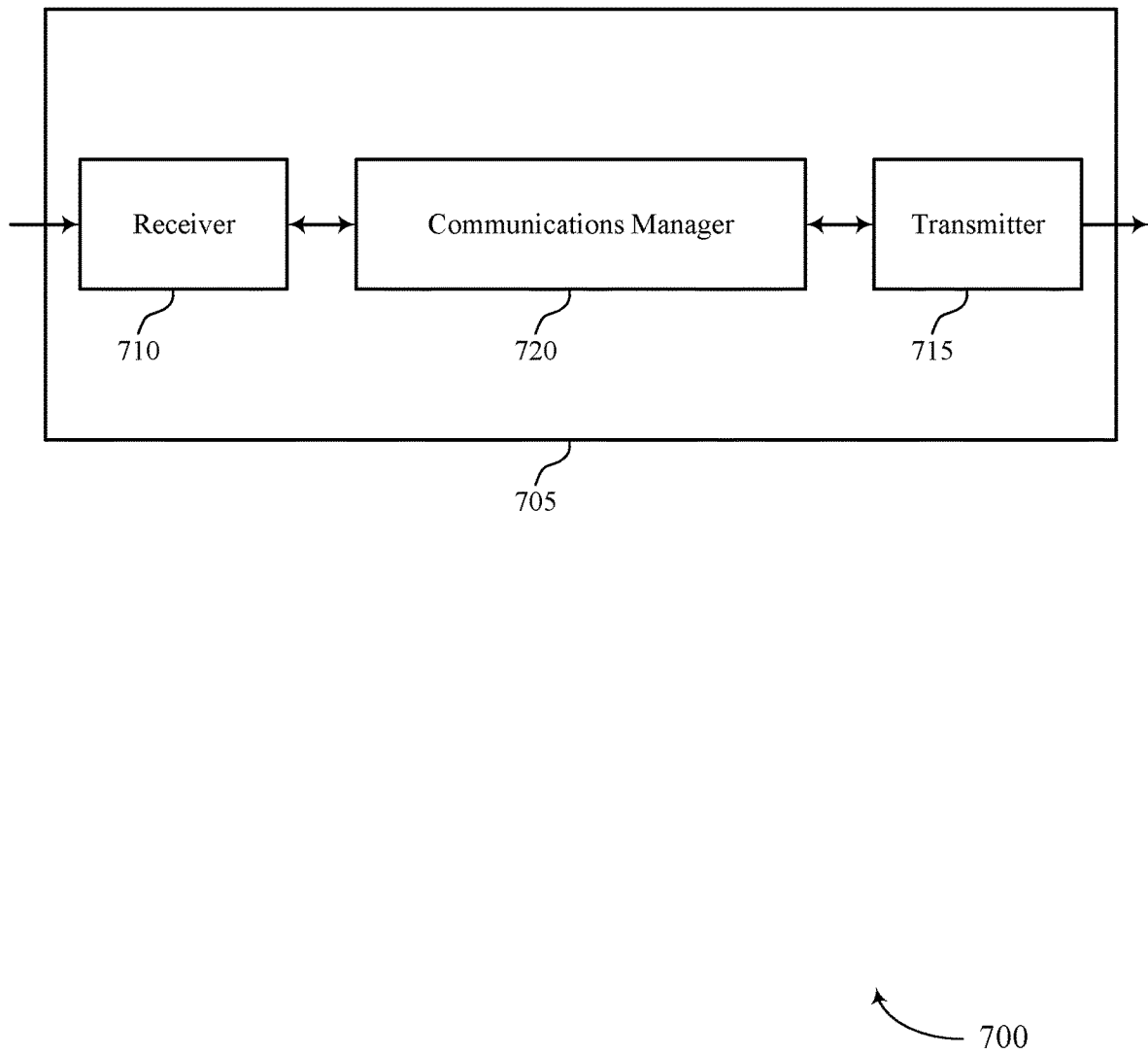
FIGS. 7 and 8 show block diagrams of devices that support feedback codebook construction for control channel carrier switching in accordance with one or more aspects of the present disclosure.

FIG. 7 shows a block diagram 700 of a device 705 that supports feedback codebook construction for control channel carrier switching in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to feedback codebook construction for control channel carrier switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to feedback codebook construction for control channel carrier switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of feedback codebook construction for control channel carrier switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving control signaling to perform a cell switch between a first cell and a second cell of a cell group. The communications manager 720 may be configured as or otherwise support a means for receiving a downlink data message during a first time interval that occurs prior to a BWP switch, where a second time interval after the first time interval is allocated for a feedback message associated with the downlink data message. The communications manager 720 may be configured as or otherwise support a means for performing, after the first time interval and before or during the second time interval, the BWP switch from a first BWP to a second BWP on one of the first cell or the second cell. The communications manager 720 may be configured as or otherwise support a means for transmitting a feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission. In some examples, the communications manager 720 may be configured as or otherwise support a means for performing the cell switch between the first cell and the second cell of the cell group according to a cell switching mode indicated in the control signaling.

Additionally, or alternatively, the communications manager 720 may support wireless communications at a UE in accordance with examples as disclosed herein. For example, the communications manager 720 may be configured as or otherwise support a means for monitoring for one or more downlink data messages, the one or more downlink data messages associated with a first time interval allocated for transmission of a feedback message associated with the one or more downlink data messages on a first cell. The communications manager 720 may be configured as or otherwise support a means for performing a BWP switch from a first BWP to a second BWP on the first cell prior to a second time interval that occurs after the first time interval. The communications manager 720 may be configured as or otherwise support a means for receiving DCI triggering a retransmission of the feedback message. The communications manager 720 may be configured as or otherwise support a means for retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

By including or configuring the communications manager 720 in accordance with examples as described herein, the device 705 (e.g., a processor controlling or otherwise coupled with the receiver 710, the transmitter 715, the communications manager 720, or a combination thereof) may support transmitting feedback signaling according to a feedback scheme based on a cell switch, a BWP switch, a mode of cell switching, or any combination thereof, which may result in improved reliability of feedback signaling, less failed feedback transmissions in cases of BWP switching and cell switching, and improved user experience. Additionally, or alternatively, the device 705 may support determining whether to retransmit dropped feedback signaling, which may result in more reliable feedback signaling, more efficient use of system resources (e.g., by leaving resources available in the case of unclear timing or resources for retransmission based on a BWP switch), decreased system latency, and improved user experience.

Figure 8:
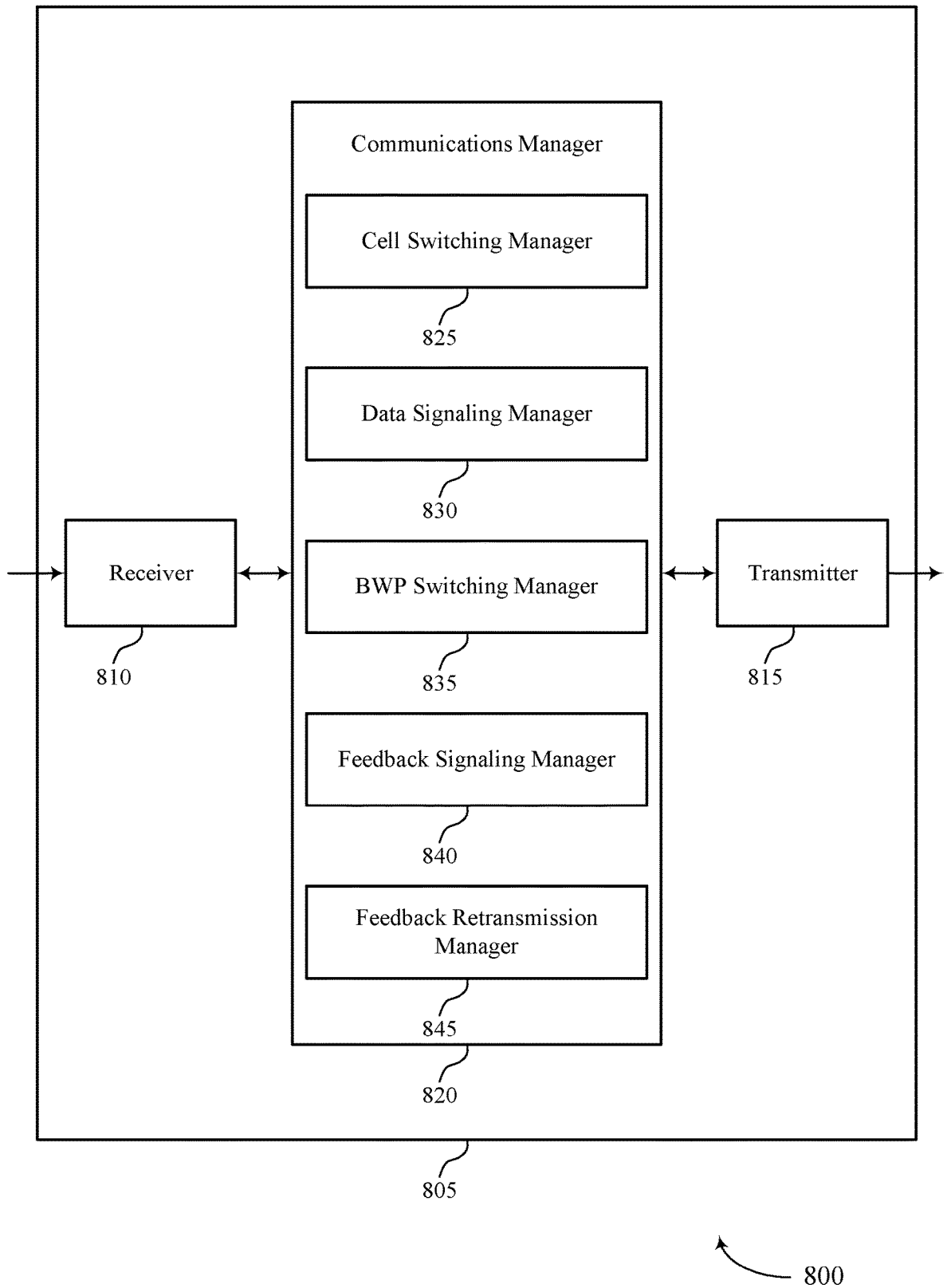

FIG. 8 shows a block diagram 800 of a device 805 that supports feedback codebook construction for control channel carrier switching in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to feedback codebook construction for control channel carrier switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to feedback codebook construction for control channel carrier switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of feedback codebook construction for control channel carrier switching as described herein. For example, the communications manager 820 may include a cell switching manager 825, a data signaling manager 830, a BWP switching manager 835, a feedback signaling manager 840, a feedback retransmission manager 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The cell switching manager 825 may be configured as or otherwise support a means for receiving control signaling to perform a cell switch between a first cell and a second cell of a cell group. The data signaling manager 830 may be configured as or otherwise support a means for receiving a downlink data message during a first time interval that occurs prior to a BWP switch, where a second time interval after the first time interval is allocated for a feedback message associated with the downlink data message. The BWP switching manager 835 may be configured as or otherwise support a means for performing, after the first time interval and before the second time interval, the BWP switch from a first BWP to a second BWP on one of the first cell or the second cell. The feedback signaling manager 840 may be configured as or otherwise support a means for transmitting a feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission. In some examples, the feedback signaling manager 840 may be configured as or otherwise support a means for performing the cell switch between the first cell and the second cell of the cell group according to a cell switching mode indicated in the control signaling.

Additionally, or alternatively, the communications manager 820 may support wireless communications at a UE in accordance with examples as disclosed herein. The data signaling manager 830 may be configured as or otherwise support a means for monitoring for one or more downlink data messages, the one or more downlink data messages associated with a first time interval allocated for transmission of a feedback message associated with the one or more downlink data messages on a first cell. The BWP switching manager 835 may be configured as or otherwise support a means for performing a BWP switch from a first BWP to a second BWP on the first cell prior to a second time interval that occurs after the first time interval. The feedback retransmission manager 845 may be configured as or otherwise support a means for receiving DCI triggering a retransmission of the feedback message. The feedback retransmission manager 845 may be configured as or otherwise support a means for retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

Figure 9:
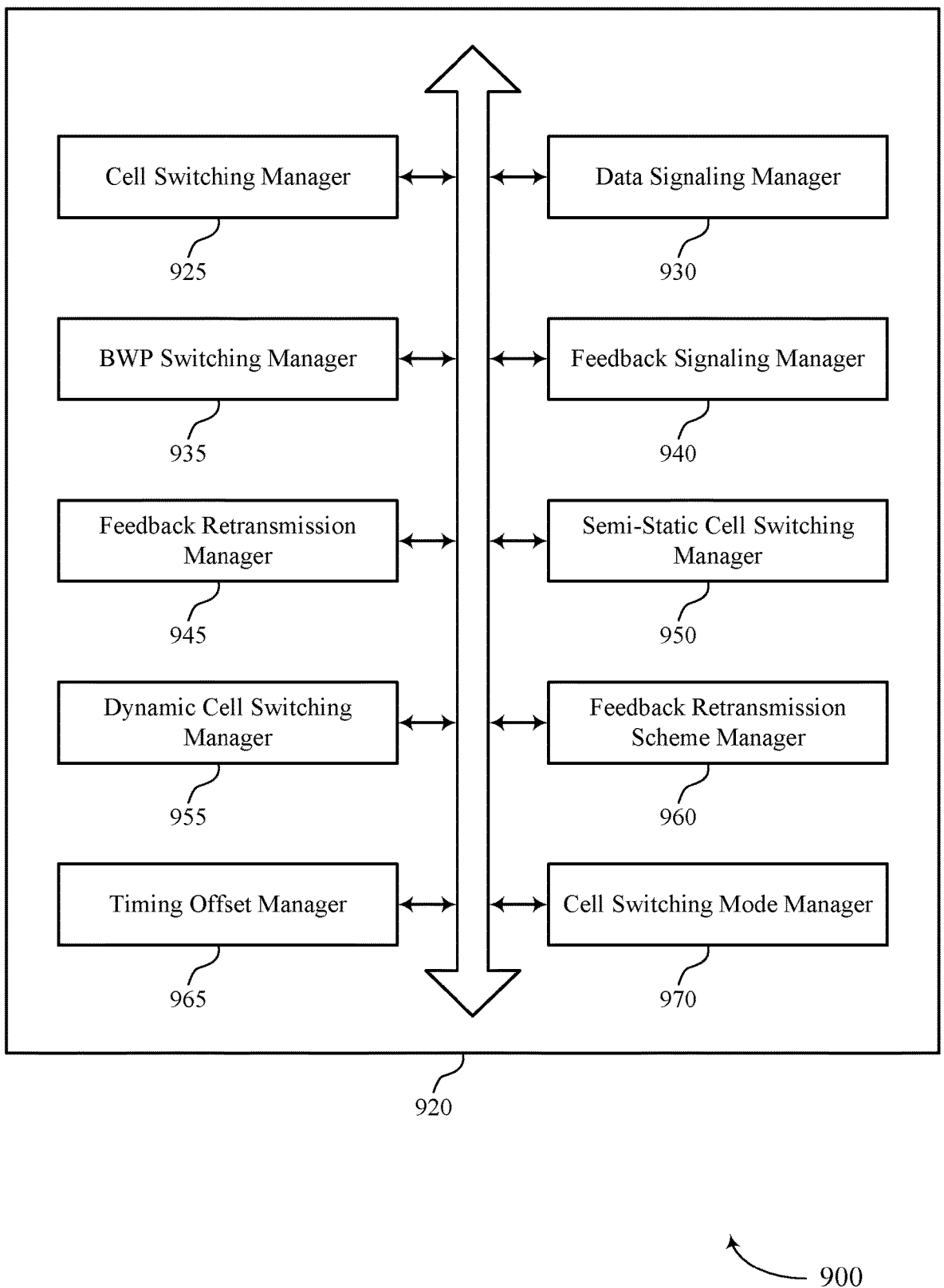
FIG. 9 shows a block diagram of a communications manager that supports feedback codebook construction for control channel carrier switching in accordance with one or more aspects of the present disclosure.

FIG. 9 shows a block diagram 900 of a communications manager 920 that supports feedback codebook construction for control channel carrier switching in accordance with one or more aspects of the present disclosure. The communications manager 920 may be an example of aspects of a communications manager 720, a communications manager 820, or both, as described herein. The communications manager 920, or various components thereof, may be an example of means for performing various aspects of feedback codebook construction for control channel carrier switching as described herein. For example, the communications manager 920 may include a cell switching manager 925, a data signaling manager 930, a BWP switching manager 935, a feedback signaling manager 940, a feedback retransmission manager 945, a semi-static cell switching manager 950, a dynamic cell switching manager 955, a feedback retransmission scheme manager 960, a timing offset manager 965, a cell switching mode manager 970, or any combination thereof. Each of these components may communicate, directly or indirectly, with one another (e.g., via one or more buses).

The communications manager 920 may support wireless communications at a UE in accordance with examples as disclosed herein. The cell switching manager 925 may be configured as or otherwise support a means for receiving control signaling to perform a cell switch between a first cell and a second cell of a cell group. The data signaling manager 930 may be configured as or otherwise support a means for receiving a downlink data message during a first time interval that occurs prior to a BWP switch, where a second time interval after the first time interval is allocated for a feedback message associated with the downlink data message. The BWP switching manager 935 may be configured as or otherwise support a means for performing, after the first time interval and before or during the second time interval, the BWP switch from a first BWP to a second BWP on one of the first cell or the second cell. The feedback signaling manager 940 may be configured as or otherwise support a means for transmitting a feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission. In some examples, the feedback signaling manager 940 may be configured as or otherwise support a means for performing the cell switch between the first cell and the second cell of the cell group according to a cell switching mode indicated in the control signaling.

In some examples, to support receiving the control signaling, the semi-static cell switching manager 950 may be configured as or otherwise support a means for receiving RRC signaling indicating that the cell switch is based on a semi-static cell switching mode, where the feedback scheme indicates whether to exclude or include the feedback information corresponding to the downlink data message based on the semi-static cell switching mode.

In some examples, to support performing the BWP switch, the BWP switching manager 935 may be configured as or otherwise support a means for performing the BWP switch from the first BWP to the second BWP on the first cell that is a PCell, where the feedback scheme indicates to exclude the feedback information corresponding to the downlink data message based on performing the BWP switch on the PCell.

In some examples, to support transmitting the feedback message, the feedback signaling manager 940 may be configured as or otherwise support a means for transmitting the feedback message on the second cell, where the first cell includes a PCell and the second cell includes a secondary cell, and where the feedback scheme indicates to exclude the feedback information corresponding to the downlink data message based on performing the BWP switch on the second cell and the feedback message being transmitted on the second cell.

In some examples, to support transmitting the feedback message, the feedback signaling manager 940 may be configured as or otherwise support a means for transmitting the feedback message on the first cell, where the first cell includes a PCell and the second cell includes a secondary cell, and where the feedback scheme indicates to include the feedback information corresponding to the downlink data message based on performing the BWP switch on the second cell and the feedback message being transmitted on the first cell.

In some examples, to support receiving the control signaling, the dynamic cell switching manager 955 may be configured as or otherwise support a means for receiving control signaling indicating that the cell switch is based on a dynamic cell switching mode, where the feedback scheme indicates to exclude or include the feedback information corresponding to the downlink data message based on the dynamic cell switching mode.

In some examples, the first cell includes a PCell and the second cell includes a secondary cell. In some examples, the feedback scheme indicates to exclude the feedback information corresponding to the downlink data message based on performing the BWP switch on the cell on which the feedback message is scheduled.

In some examples, the first cell includes a PCell and the second cell includes a secondary cell. In some examples, the feedback scheme indicates to include the feedback information corresponding to the downlink data message based on performing the BWP switch on a different cell than the cell on which the feedback message is scheduled.

In some examples, the communications manager 920 may support performing the cell switch between the first cell and the second cell of the cell group according to a cell switching mode indicated in the control signaling.

Additionally, or alternatively, the communications manager 920 may support wireless communications at a UE in accordance with examples as disclosed herein. In some examples, the data signaling manager 930 may be configured as or otherwise support a means for monitoring for one or more downlink data messages, the one or more downlink data messages associated with a first time interval allocated for transmission of a feedback message associated with the one or more downlink data messages on a first cell. In some examples, the BWP switching manager 935 may be configured as or otherwise support a means for performing a BWP switch from a first BWP to a second BWP on the first cell prior to a second time interval that occurs after the first time interval. The feedback retransmission manager 945 may be configured as or otherwise support a means for receiving DCI triggering a retransmission of the feedback message. In some examples, the feedback retransmission manager 945 may be configured as or otherwise support a means for retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

In some examples, the feedback retransmission scheme manager 960 may be configured as or otherwise support a means for determining not to retransmit the feedback message during the second time interval in accordance with the feedback retransmission scheme indicating an error case based on one or more of whether cell switching is configured for the first cell, on which of the first cell or a second cell switching from the first BWP to the second BWP occurs, or on which of the first cell or second cell the retransmission of the feedback message is scheduled.

In some examples, the feedback retransmission scheme manager 960 may be configured as or otherwise support a means for determining not to retransmit the feedback message during the second time interval in accordance with the feedback retransmission scheme indicating to skip the retransmission based on one or more of whether cell switching is configured for the first cell, on which of the first cell or a second cell switching from the first BWP to the second BWP occurs, or on which of the first cell or second cell the retransmission of the feedback message is scheduled.

In some examples, the feedback retransmission scheme manager 960 may be configured as or otherwise support a means for determining whether to retransmit the feedback message or skip the feedback message in accordance with the feedback retransmission scheme based on whether receiving the DCI occurs before or after performing the BWP switch.

In some examples, the timing offset manager 965 may be configured as or otherwise support a means for receiving control signaling indicating a timing offset between the first time interval allocated for the transmission of the feedback message and a third time interval in which the DCI triggering the retransmission of the feedback message is received, where retransmitting the feedback message occurs on the second BWP and is based on the timing offset according to a time interval duration associated with the second BWP.

In some examples, the feedback retransmission manager 945 may be configured as or otherwise support a means for retransmitting the feedback message in a first uplink time interval of the second BWP that overlaps in time with a second uplink time interval of the first BWP, where the second uplink time interval of the first BWP occurs after the timing offset.

In some examples, the first BWP includes an uplink BWP on the first cell and the second BWP includes an uplink BWP on the first cell.

In some examples, the first BWP includes a downlink BWP and the second BWP includes a downlink BWP.

In some examples, the cell switching mode manager 970 may be configured as or otherwise support a means for receiving control signaling indicating a first cell switch mode for switching between the first cell and the second cell that correspond to a cell group, where retransmitting the feedback message, or determining not to retransmit the feedback message, is based on the first cell switch mode.

In some examples, the transmission of the feedback message, a retransmission of the feedback message, or both, are scheduled on a secondary cell of the cell group.

In some examples, the UE operates according to a first cell switch mode that does not support switching for the first cell a cell group. In some examples, retransmitting the feedback message, or determining not to retransmit the feedback message, is based on the first cell switch mode.

In some examples, the feedback signaling manager 940 may be configured as or otherwise support a means for performing the cell switch between the first cell and the second cell of the cell group according to a cell switching mode indicated in the control signaling.

Figure 10:
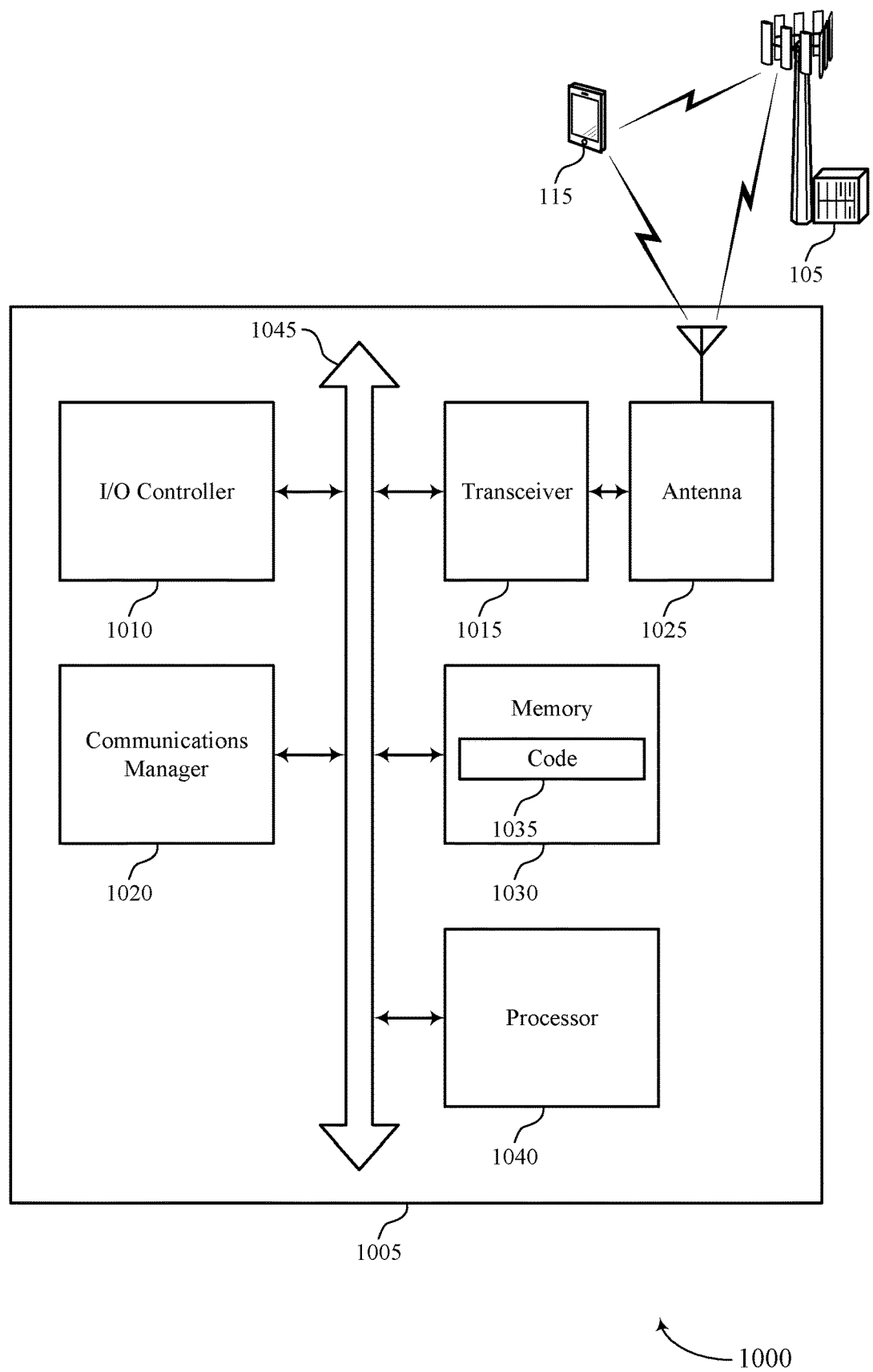
FIG. 10 shows a diagram of a system including a device that supports feedback codebook construction for control channel carrier switching in accordance with one or more aspects of the present disclosure.

FIG. 10 shows a diagram of a system 1000 including a device 1005 that supports feedback codebook construction for control channel carrier switching in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting feedback codebook construction for control channel carrier switching). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving control signaling to perform a cell switch between a first cell and a second cell of a cell group. The communications manager 1020 may be configured as or otherwise support a means for receiving a downlink data message during a first time interval that occurs prior to a BWP switch, where a second time interval after the first time interval is allocated for a feedback message associated with the downlink data message. The communications manager 1020 may be configured as or otherwise support a means for performing, after the first time interval and before or during the second time interval, the BWP switch from a first BWP to a second BWP on one of the first cell or the second cell. The communications manager 1020 may be configured as or otherwise support a means for transmitting a feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission.

Additionally, or alternatively, the communications manager 1020 may support wireless communications at a UE in accordance with examples as disclosed herein. For example, the communications manager 1020 may be configured as or otherwise support a means for monitoring for one or more downlink data messages, the one or more downlink data messages associated with a first time interval allocated for transmission of a feedback message associated with the one or more downlink data messages on a first cell. The communications manager 1020 may be configured as or otherwise support a means for performing a BWP switch from a first BWP to a second BWP on the first cell prior to a second time interval that occurs after the first time interval. The communications manager 1020 may be configured as or otherwise support a means for receiving DCI triggering a retransmission of the feedback message. The communications manager 1020 may be configured as or otherwise support a means for retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled.

By including or configuring the communications manager 1020 in accordance with examples as described herein, the device 1005 may support transmitting feedback signaling according to a feedback scheme based on a cell switch, a BWP switch, a mode of cell switching, or any combination thereof, which may result in improved reliability of feedback signaling, less failed feedback transmissions in cases of BWP switching and cell switching, and improved user experience. Additionally, or alternatively, the device 1005 may support determining whether to retransmit dropped feedback signaling, which may result in more reliable feedback signaling, more efficient use of system resources (e.g., by leaving resources available in the case of unclear timing or resources for retransmission based on a BWP switch), decreased system latency, and improved user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of feedback codebook construction for control channel carrier switching as described herein, or the processor 1040 and the memory 1030 may be otherwise configured to perform or support such operations.

Figure 11:
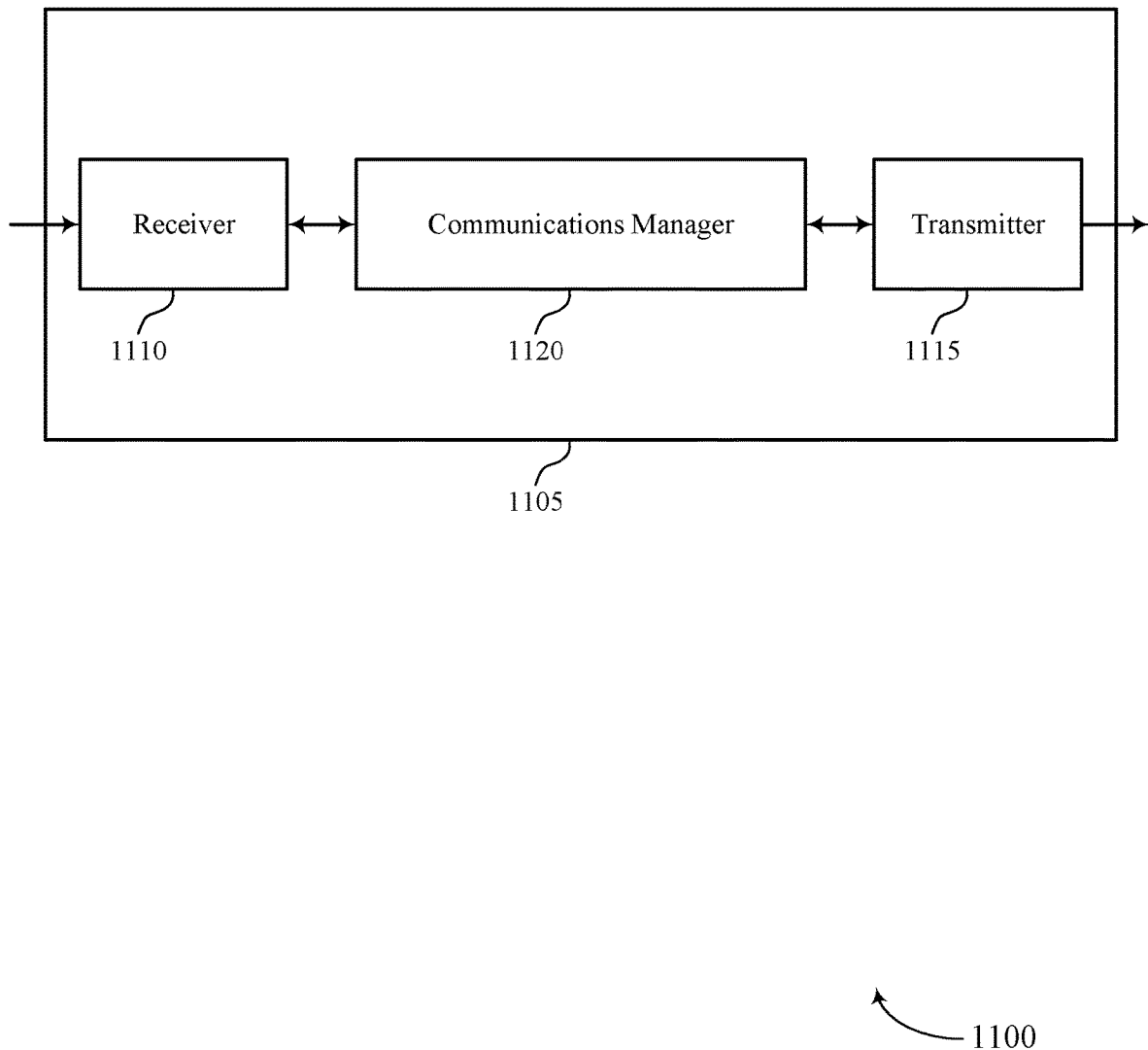
FIGS. 11 and 12 show block diagrams of devices that support feedback codebook construction for control channel carrier switching in accordance with one or more aspects of the present disclosure.

FIG. 11 shows a block diagram 1100 of a device 1105 that supports feedback codebook construction for control channel carrier switching in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of feedback codebook construction for control channel carrier switching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for transmitting control signaling to perform a cell switch between a first cell and a second cell of a cell group. The communications manager 1120 may be configured as or otherwise support a means for transmitting a downlink data message during a first time interval that occurs prior to a BWP switch from a first BWP to a second BWP on one of the first cell or the second cell, where a second time interval after the first time interval is allocated for a feedback message associated with the downlink data message. The communications manager 1120 may be configured as or otherwise support a means for performing, after the first time interval and before or during a second time interval, the BWP switch from a first BWP to a second BWP on one of the first cell or the second cell. The communications manager 1120 may be configured as or otherwise support a means for receiving the feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission.

Additionally, or alternatively, the communications manager 1120 may support wireless communications at a network entity in accordance with examples as disclosed herein. For example, the communications manager 1120 may be configured as or otherwise support a means for transmitting one or more downlink data messages, the one or more downlink data messages associated with a first time interval allocated for a feedback message associated with the one or more downlink data messages from a UE on a first cell. The communications manager 1120 may be configured as or otherwise support a means for performing a BWP switch from a first BWP to a second BWP on the first cell prior to a second time interval that occurs after the first time interval. The communications manager 1120 may be configured as or otherwise support a means for transmitting DCI triggering a retransmission of the feedback message. The communications manager 1120 may be configured as or otherwise support a means for receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support transmitting feedback signaling according to a feedback scheme based on a cell switch, a BWP switch, a mode of cell switching, or any combination thereof, which may result in improved reliability of feedback signaling, less failed feedback transmissions in cases of BWP switching and cell switching, and improved user experience. Additionally, or alternatively, the device 1105 may support determining whether to retransmit dropped feedback signaling, which may result in more reliable feedback signaling, more efficient use of system resources (e.g., by leaving resources available in the case of unclear timing or resources for retransmission based on a BWP switch), decreased system latency, and improved user experience.

Figure 12:
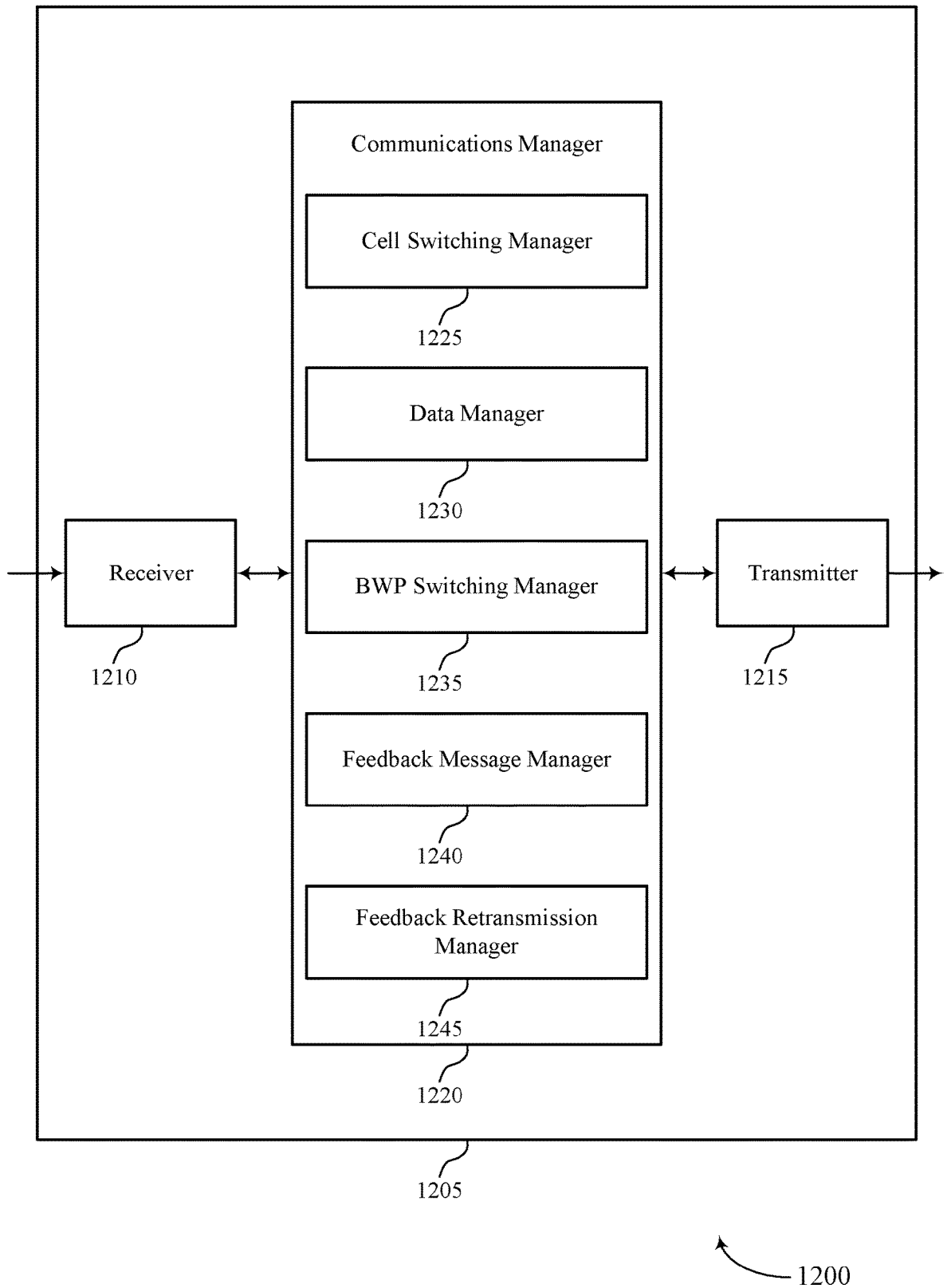

FIG. 12 shows a block diagram 1200 of a device 1205 that supports feedback codebook construction for control channel carrier switching in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of feedback codebook construction for control channel carrier switching as described herein. For example, the communications manager 1220 may include a cell switching manager 1225, a data manager 1230, a BWP switching manager 1235, a feedback message manager 1240, a feedback retransmission manager 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The cell switching manager 1225 may be configured as or otherwise support a means for transmitting control signaling to perform a cell switch between a first cell and a second cell of a cell group. The data manager 1230 may be configured as or otherwise support a means for transmitting a downlink data message during a first time interval that occurs prior to a BWP switch from a first BWP to a second BWP on one of the first cell or the second cell, where a second time interval after the first time interval is allocated for a feedback message associated with the downlink data message. The BWP switching manager 1235 may be configured as or otherwise support a means for performing, after the first time interval and before or during a second time interval, the BWP switch from a first BWP to a second BWP on one of the first cell or the second cell. The feedback message manager 1240 may be configured as or otherwise support a means for receiving the feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission.

Additionally, or alternatively, the communications manager 1220 may support wireless communications at a network entity in accordance with examples as disclosed herein. The data manager 1230 may be configured as or otherwise support a means for transmitting one or more downlink data messages, the one or more downlink data messages associated with a first time interval allocated for a feedback message associated with the one or more downlink data messages from a UE on a first cell. The BWP switching manager 1235 may be configured as or otherwise support a means for performing a BWP switch from a first BWP to a second BWP on the first cell prior to a second time interval that occurs after the first time interval. The feedback retransmission manager 1245 may be configured as or otherwise support a means for transmitting DCI triggering a retransmission of the feedback message. The feedback retransmission manager 1245 may be configured as or otherwise support a means for receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

Figure 13:
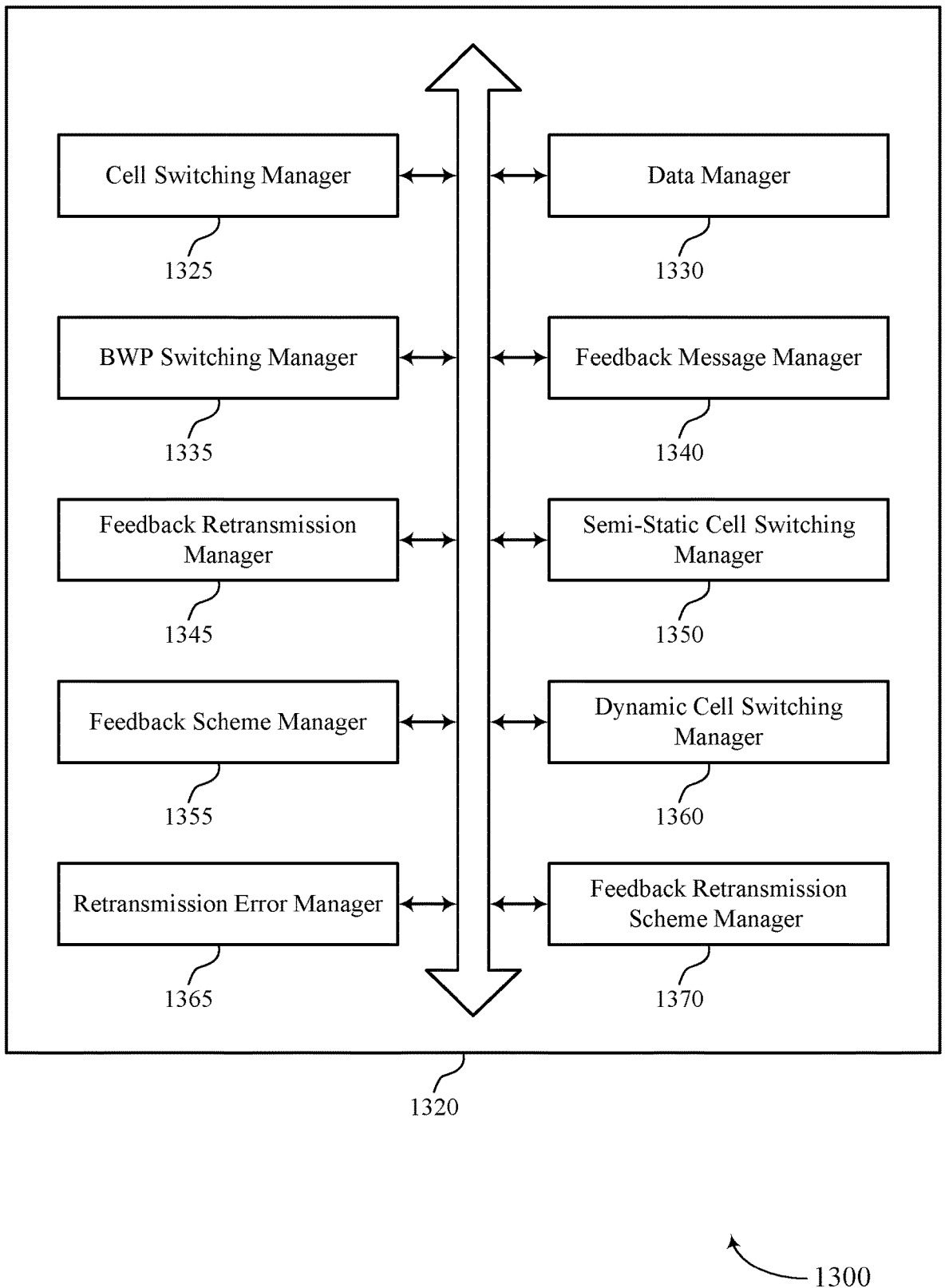
FIG. 13 shows a block diagram of a communications manager that supports feedback codebook construction for control channel carrier switching in accordance with one or more aspects of the present disclosure.

FIG. 13 shows a block diagram 1300 of a communications manager 1320 that supports feedback codebook construction for control channel carrier switching in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of feedback codebook construction for control channel carrier switching as described herein. For example, the communications manager 1320 may include a cell switching manager 1325, a data manager 1330, a BWP switching manager 1335, a feedback message manager 1340, a feedback retransmission manager 1345, a semi-static cell switching manager 1350, a feedback scheme manager 1355, a dynamic cell switching manager 1360, a retransmission error manager 1365, a feedback retransmission scheme manager 1370, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The cell switching manager 1325 may be configured as or otherwise support a means for transmitting control signaling to perform a cell switch between a first cell and a second cell of a cell group. The data manager 1330 may be configured as or otherwise support a means for transmitting a downlink data message during a first time interval that occurs prior to a BWP switch from a first BWP to a second BWP on one of the first cell or the second cell, where a second time interval after the first time interval is allocated for a feedback message associated with the downlink data message. The BWP switching manager 1335 may be configured as or otherwise support a means for performing, after the first time interval and before or during a second time interval, the BWP switch from a first BWP to a second BWP on one of the first cell or the second cell. The feedback message manager 1340 may be configured as or otherwise support a means for receiving the feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission.

In some examples, the semi-static cell switching manager 1350 may be configured as or otherwise support a means for transmitting control RRC signaling indicating that the cell switch is based on a semi-static cell switching mode, where the feedback scheme indicates to exclude or include the feedback information corresponding to the downlink data message based on the semi-static cell switching mode.

In some examples, to support performing the BWP switch, the feedback scheme manager 1355 may be configured as or otherwise support a means for performing the BWP switch from the first BWP to the second BWP on the first cell that is a PCell, where the feedback scheme indicates to exclude the feedback information corresponding to the downlink data message based on performing the BWP switch on the PCell.

In some examples, to support receiving the feedback message, the feedback scheme manager 1355 may be configured as or otherwise support a means for receiving the feedback message on the second cell, where the first cell includes a PCell and the second cell includes a secondary cell, and where the feedback scheme indicates to exclude the feedback information corresponding to the downlink data message based on performing the BWP switch on the second cell and the feedback message being receiving on the second cell.

In some examples, to support receiving the feedback message, the feedback scheme manager 1355 may be configured as or otherwise support a means for receiving the feedback message on the first cell, where the first cell includes a PCell and the second cell includes a secondary cell, and where the feedback scheme indicates to include the feedback information corresponding to the downlink data message based on performing the BWP switch on the second cell and the feedback message being receiving on the first cell.

In some examples, to support transmitting the control signaling, the dynamic cell switching manager 1360 may be configured as or otherwise support a means for transmitting control signaling indicating that the cell switch is based on a dynamic cell switching mode, where the feedback scheme indicates to exclude or include the feedback information corresponding to the downlink data message based on the dynamic cell switching mode.

In some examples, the first cell includes a PCell and the second cell includes a secondary cell, and the feedback scheme indicates to exclude the feedback information corresponding to the downlink data message based on performing the BWP switch on the cell on which the feedback message is scheduled.

Additionally, or alternatively, the communications manager 1320 may support wireless communications at a network entity in accordance with examples as disclosed herein. In some examples, the data manager 1330 may be configured as or otherwise support a means for transmitting one or more downlink data messages, the one or more downlink data messages associated with a first time interval allocated for a feedback message associated with the one or more downlink data messages from a UE on a first cell. In some examples, the BWP switching manager 1335 may be configured as or otherwise support a means for performing a BWP switch from a first BWP to a second BWP on the first cell prior to a second time interval that occurs after the first time interval. The feedback retransmission manager 1345 may be configured as or otherwise support a means for transmitting DCI triggering a retransmission of the feedback message. In some examples, the feedback retransmission manager 1345 may be configured as or otherwise support a means for receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

In some examples, the retransmission error manager 1365 may be configured as or otherwise support a means for determining not to monitor for, or failing to receive, the feedback message during the second time interval in accordance with the feedback retransmission scheme indicating an error case based on one or more of whether cell switching is configured for the first cell, on which of the first cell or a second cell switching from the first BWP to the second BWP occurs, or on which of the first cell or second cell the retransmission of the feedback message is scheduled.

In some examples, the feedback retransmission scheme manager 1370 may be configured as or otherwise support a means for determining not to monitor for, or failing to receive, the feedback message during the second time interval in accordance with the feedback retransmission scheme indicating to skip retransmission of the feedback message based on one or more of whether cell switching is configured for the first cell, on which of the first cell or a second cell switching from the first BWP to the second BWP occurs, or on which of the first cell or second cell the retransmission of the feedback message is scheduled.

In some examples, the feedback retransmission scheme manager 1370 may be configured as or otherwise support a means for transmitting control signaling indicating a timing offset between the first time interval allocated for the feedback message and a third time interval in which the DCI triggering the retransmission of the feedback message is received, where receiving the feedback message occurs on the second BWP and is based on the timing offset according to a time interval duration associated with the second BWP.

Figure 14:
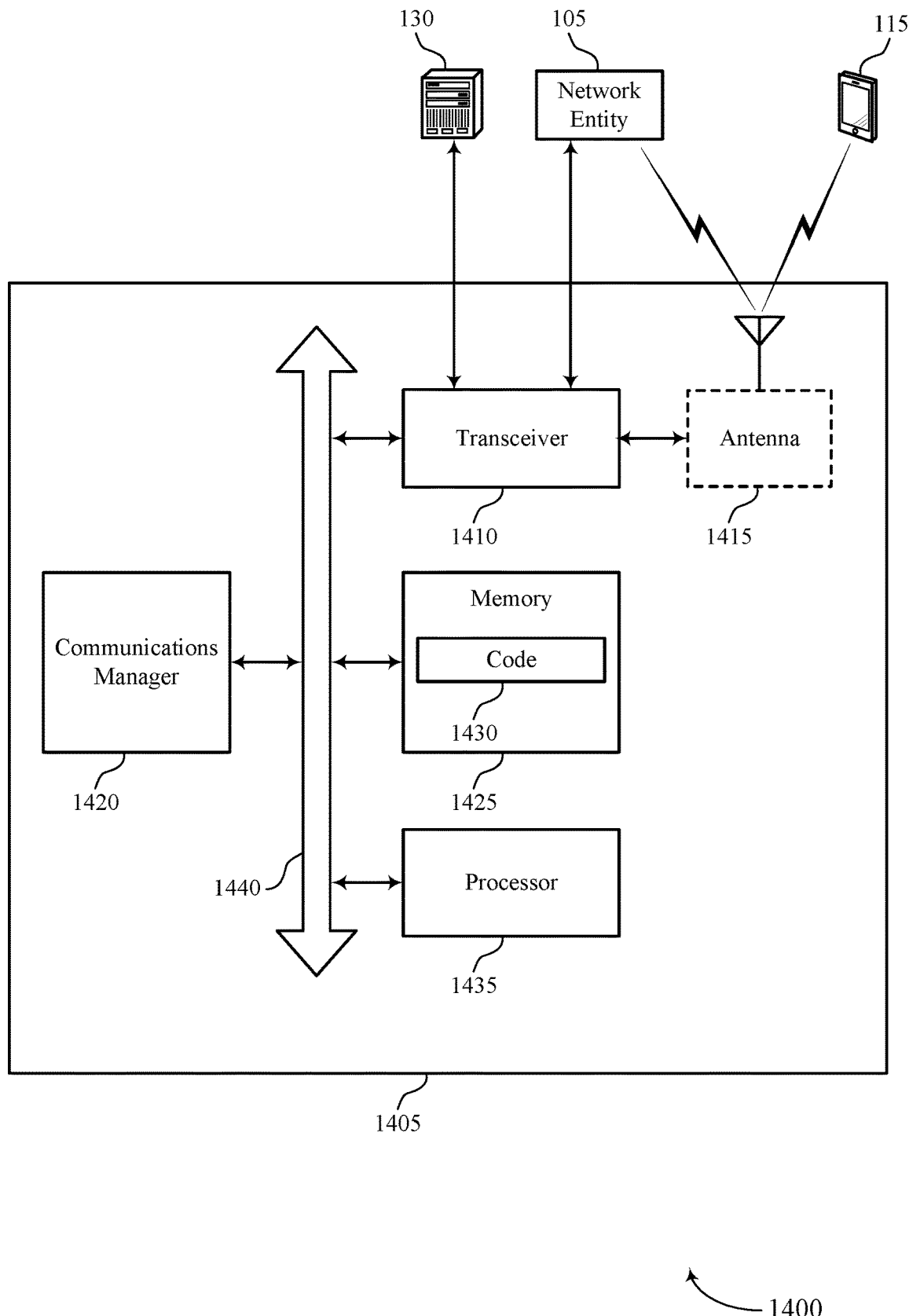
FIG. 14 shows a diagram of a system including a device that supports feedback codebook construction for control channel carrier switching in accordance with one or more aspects of the present disclosure.

FIG. 14 shows a diagram of a system 1400 including a device 1405 that supports feedback codebook construction for control channel carrier switching in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory.

In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting feedback codebook construction for control channel carrier switching). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting control signaling to perform a cell switch between a first cell and a second cell of a cell group. The communications manager 1420 may be configured as or otherwise support a means for transmitting a downlink data message during a first time interval that occurs prior to a BWP switch from a first BWP to a second BWP on one of the first cell or the second cell, where a second time interval after the first time interval is allocated for a feedback message associated with the downlink data message. The communications manager 1420 may be configured as or otherwise support a means for performing, after the first time interval and before or during a second time interval, the BWP switch from a first BWP to a second BWP on one of the first cell or the second cell. The communications manager 1420 may be configured as or otherwise support a means for receiving the feedback message according to a feedback scheme, where the feedback scheme indicates whether to exclude or include feedback information corresponding to the downlink data message based on one or more of the cell switch, the BWP switch, or which of the first cell or the second cell the feedback message is scheduled for transmission.

Additionally, or alternatively, the communications manager 1420 may support wireless communications at a network entity in accordance with examples as disclosed herein. For example, the communications manager 1420 may be configured as or otherwise support a means for transmitting one or more downlink data messages, the one or more downlink data messages associated with a first time interval allocated for a feedback message associated with the one or more downlink data messages from a UE on a first cell. The communications manager 1420 may be configured as or otherwise support a means for performing a BWP switch from a first BWP to a second BWP on the first cell prior to a second time interval that occurs after the first time interval. The communications manager 1420 may be configured as or otherwise support a means for transmitting DCI triggering a retransmission of the feedback message. The communications manager 1420 may be configured as or otherwise support a means for receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled.

By including or configuring the communications manager 1420 in accordance with examples as described herein, the device 1405 may support transmitting feedback signaling according to a feedback scheme based on a cell switch, a BWP switch, a mode of cell switching, or any combination thereof, which may result in improved reliability of feedback signaling, less failed feedback transmissions in cases of BWP switching and cell switching, and improved user experience. Additionally, or alternatively, the device 1405 may support determining whether to retransmit dropped feedback signaling, which may result in more reliable feedback signaling, more efficient use of system resources (e.g., by leaving resources available in the case of unclear timing or resources for retransmission based on a BWP switch), decreased system latency, and improved user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of feedback codebook construction for control channel carrier switching as described herein, or the processor 1435 and the memory 1425 may be otherwise configured to perform or support such operations.

Figure 15:
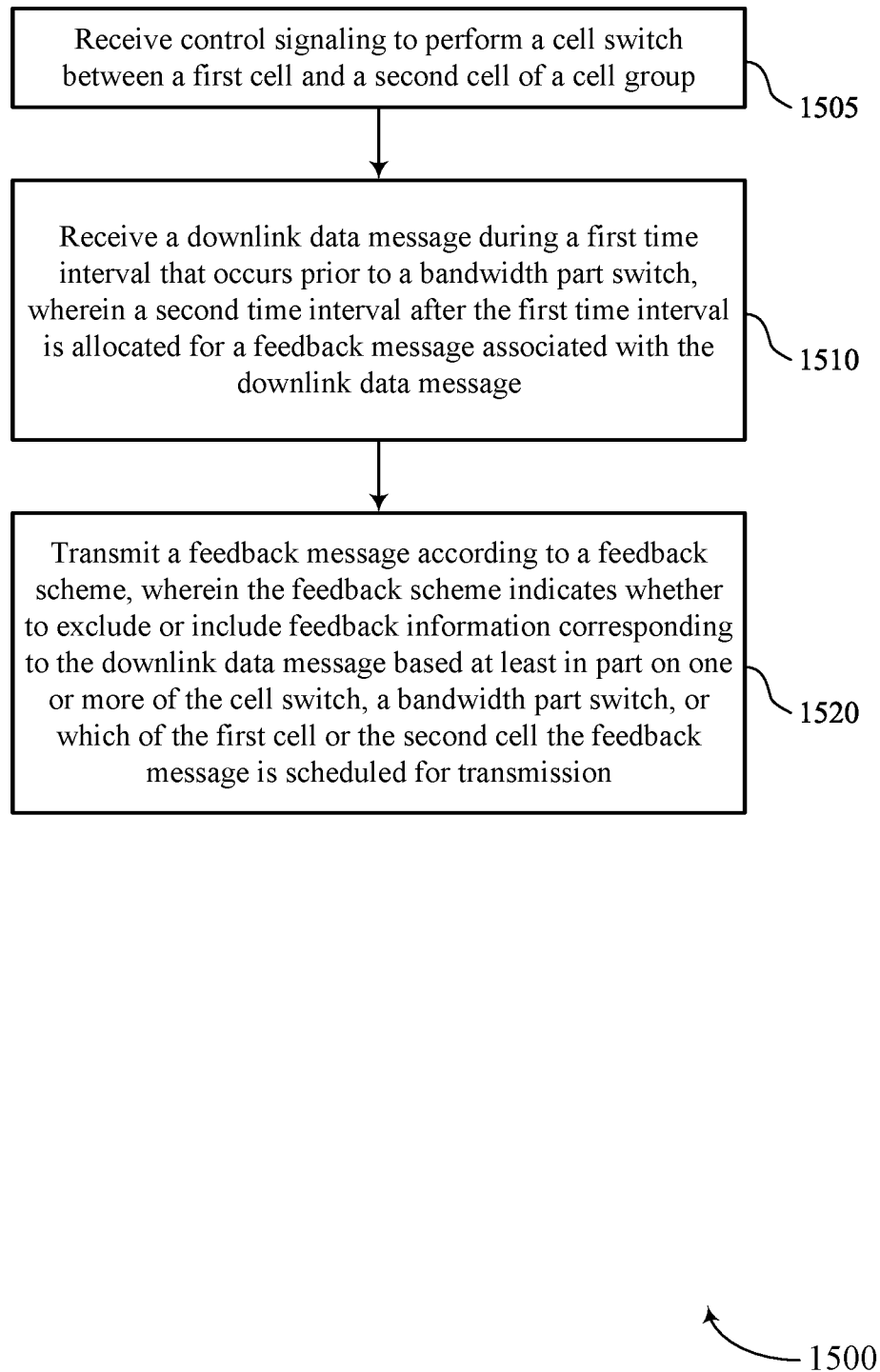
FIGS. 15 through 18 show flowcharts illustrating methods that support feedback codebook construction for control channel carrier switching in accordance with one or more aspects of the present disclosure.

FIG. 15 shows a flowchart illustrating a method 1500 that supports feedback codebook construction for control channel carrier switching in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling to perform a cell switch between a first cell and a second cell of a cell group. The operations of 1505 may be performed in accordance with examples as disclosed herein. In some examples, aspects of the operations of 1505 may be performed by a cell switching manager 925 as described with reference to FIG. 9.

At 1510, the method may include receiving a downlink data message during a first time interval that occurs prior to a BWP switch, where a second time interval after the first time interval is allocated for a feedback message associated with the downlink data message. The operations of 1510 may be performed in accordance with examples as disclosed herein. In some examples, aspects of the operations of 1510 may be performed by a data signaling manager 930 as described with reference to FIG. 9.

At 1520, the method may include transmitting a feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission. The operations of 1520 may be performed in accordance with examples as disclosed herein. In some examples, aspects of the operations of 1520 may be performed by a feedback signaling manager 940 as described with reference to FIG. 9.

Figure 16:
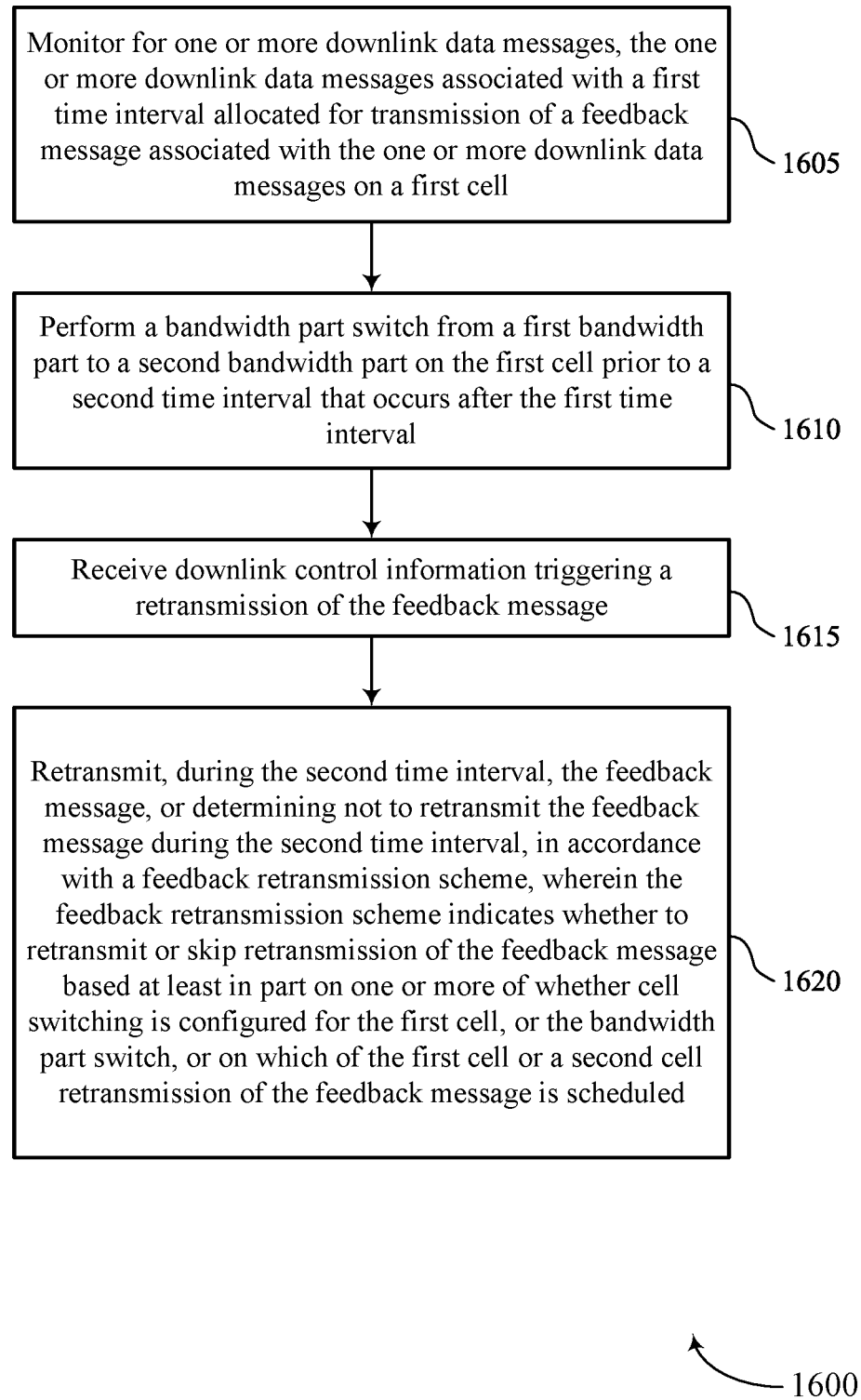

FIG. 16 shows a flowchart illustrating a method 1600 that supports feedback codebook construction for control channel carrier switching in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include monitoring for one or more downlink data messages, the one or more downlink data messages associated with a first time interval allocated for transmission of a feedback message associated with the one or more downlink data messages on a first cell. The operations of 1605 may be performed in accordance with examples as disclosed herein. In some examples, aspects of the operations of 1605 may be performed by a data signaling manager 930 as described with reference to FIG. 9.

At 1610, the method may include performing a BWP switch from a first BWP to a second BWP on the first cell prior to a second time interval that occurs after the first time interval. The operations of 1610 may be performed in accordance with examples as disclosed herein. In some examples, aspects of the operations of 1610 may be performed by a BWP switching manager 935 as described with reference to FIG. 9.

At 1615, the method may include receiving DCI triggering a retransmission of the feedback message. The operations of 1615 may be performed in accordance with examples as disclosed herein. In some examples, aspects of the operations of 1615 may be performed by a feedback retransmission manager 945 as described with reference to FIG. 9.

At 1620, the method may include retransmitting, during the second time interval, the feedback message, or determining not to retransmit the feedback message during the second time interval, in accordance with a feedback retransmission scheme, where the feedback retransmission scheme indicates whether to retransmit or skip retransmission of the feedback message based on one or more of whether cell switching is configured for the first cell, or the BWP switch, or on which of the first cell or a second cell retransmission of the feedback message is scheduled. The operations of 1620 may be performed in accordance with examples as disclosed herein. In some examples, aspects of the operations of 1620 may be performed by a feedback retransmission manager 945 as described with reference to FIG. 9.

Figure 17:
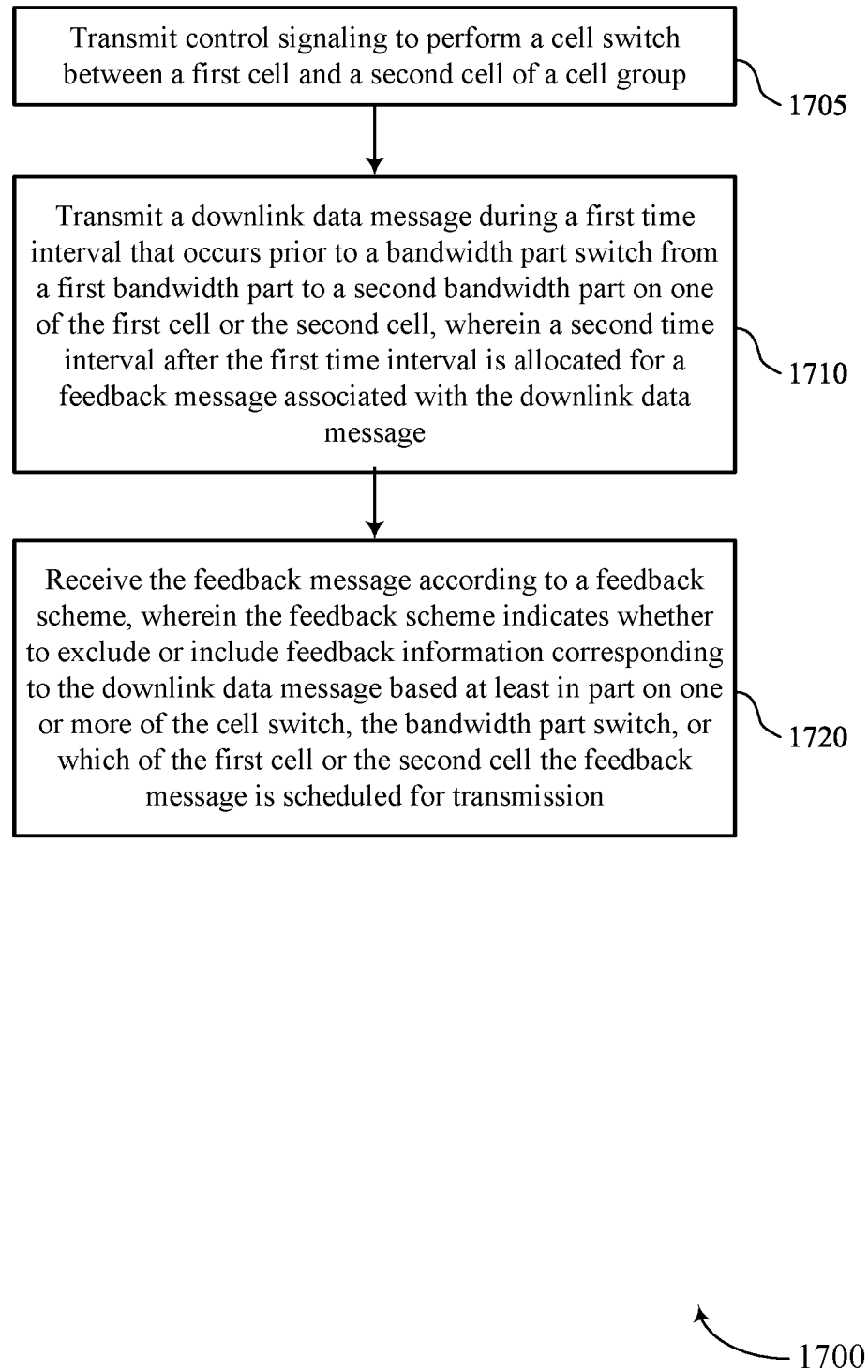

FIG. 17 shows a flowchart illustrating a method 1700 that supports feedback codebook construction for control channel carrier switching in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling to perform a cell switch between a first cell and a second cell of a cell group. The operations of 1705 may be performed in accordance with examples as disclosed herein. In some examples, aspects of the operations of 1705 may be performed by a cell switching manager 1325 as described with reference to FIG. 13.

At 1710, the method may include transmitting a downlink data message during a first time interval that occurs prior to a BWP switch from a first BWP to a second BWP on one of the first cell or the second cell, where a second time interval after the first time interval is allocated for a feedback message associated with the downlink data message. The operations of 1710 may be performed in accordance with examples as disclosed herein. In some examples, aspects of the operations of 1710 may be performed by a data manager 1330 as described with reference to FIG. 13.

At 1720, the method may include receiving the feedback message according to a feedback scheme, where the feedback scheme indicates whether to exclude or include feedback information corresponding to the downlink data message based on one or more of the cell switch, a BWP switch, or which of the first cell or the second cell the feedback message is scheduled for transmission. The operations of 1720 may be performed in accordance with examples as disclosed herein. In some examples, aspects of the operations of 1720 may be performed by a feedback message manager 1340 as described with reference to FIG. 13.

Figure 18:
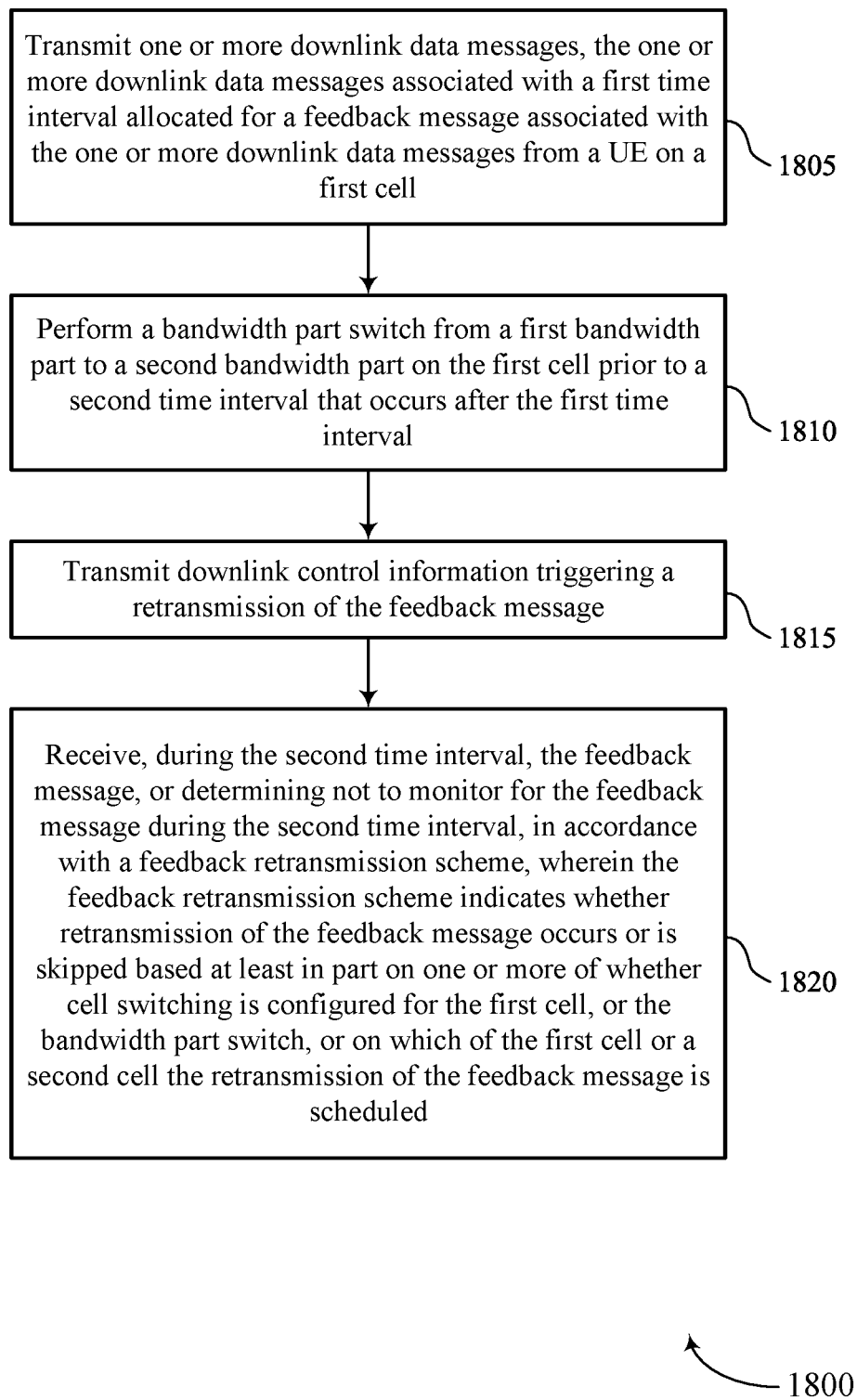

FIG. 18 shows a flowchart illustrating a method 1800 that supports feedback codebook construction for control channel carrier switching in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting one or more downlink data messages, the one or more downlink data messages associated with a first time interval allocated for a feedback message associated with the one or more downlink data messages from a UE on a first cell. The operations of 1805 may be performed in accordance with examples as disclosed herein. In some examples, aspects of the operations of 1805 may be performed by a data manager 1330 as described with reference to FIG. 13.

At 1810, the method may include performing a BWP switch from a first BWP to a second BWP on the first cell prior to a second time interval that occurs after the first time interval. The operations of 1810 may be performed in accordance with examples as disclosed herein. In some examples, aspects of the operations of 1810 may be performed by a BWP switching manager 1335 as described with reference to FIG. 13.

At 1815, the method may include transmitting DCI triggering a retransmission of the feedback message. The operations of 1815 may be performed in accordance with examples as disclosed herein. In some examples, aspects of the operations of 1815 may be performed by a feedback retransmission manager 1345 as described with reference to FIG. 13.

At 1820, the method may include receiving, during the second time interval, the feedback message, or determining not to monitor for the feedback message during the second time interval, in accordance with a feedback retransmission scheme, where the feedback retransmission scheme indicates whether retransmission of the feedback message occurs or is skipped based on one or more of whether cell switching is configured for the first cell, or the BWP switch, or on which of the first cell or a second cell the retransmission of the feedback message is scheduled. The operations of 1820 may be performed in accordance with examples as disclosed herein. In some examples, aspects of the operations of 1820 may be performed by a feedback retransmission manager 1345 as described with reference to FIG. 13.

The following provides an overview of aspects of the present disclosure:

Aspect 1: A method for wireless communications at a UE, comprising: receiving control signaling to perform a cell switch between a first cell and a second cell of a cell group; receiving a downlink data message during a first time interval that occurs prior to a BWP switch, wherein a second time interval after the first time interval is allocated for a feedback message associated with the downlink data message; and transmitting a feedback message according to a feedback scheme, wherein the feedback scheme indicates whether to exclude or include feedback information corresponding to the downlink data message based at least in part on one or more of the cell switch, a BWP switch, or which of the first cell or the second cell the feedback message is scheduled for transmission.

Aspect 2: The method of aspect 1, wherein receiving the control signaling comprises: receiving RRC signaling indicating that the cell switch is based at least in part on a semi-static cell switching mode, wherein the feedback scheme indicates whether to exclude or include the feedback information corresponding to the downlink data message based at least in part on the semi-static cell switching mode.

Aspect 3: The apparatus of any of aspects 1 through 2, further comprising: performing the BWP switch from a first BWP to a second BWP on the first cell that is a primary cell, wherein the feedback scheme indicates to exclude the feedback information corresponding to the downlink data message based at least in part on performing the BWP switch on the primary cell.

Aspect 4: The method of any of aspects 1 through 3, wherein transmitting the feedback message comprises: transmitting the feedback message on the second cell, wherein the first cell comprises a primary cell and the second cell comprises a secondary cell, and wherein the feedback scheme indicates to exclude the feedback information corresponding to the downlink data message based at least in part on performing the BWP switch on the second cell and the feedback message being transmitted on the second cell.

Aspect 5: The method of any of aspects 1 through 4, wherein transmitting the feedback message comprises: transmitting the feedback message on the first cell, wherein the first cell comprises a primary cell and the second cell comprises a secondary cell, and wherein the feedback scheme indicates to include the feedback information corresponding to the downlink data message based at least in part on performing the BWP switch on the second cell and the feedback message being transmitted on the first cell.

Aspect 6: The method of any of aspects 1 through 5, wherein receiving the control signaling comprises: receiving control signaling indicating that the cell switch is based at least in part on a dynamic cell switching mode, wherein the feedback scheme indicates to exclude or include the feedback information corresponding to the downlink data message based at least in part on the dynamic cell switching mode.

Aspect 7: The method of any of aspects 1 through 6, wherein the feedback scheme indicates to exclude the feedback information corresponding to the downlink data message based at least in part on performing the BWP switch on the cell on which the feedback message is scheduled.

Aspect 8: The method of any of aspects 1 through 7, wherein the feedback scheme indicates to include the feedback information corresponding to the downlink data message based at least in part on performing the BWP switch on a different cell than the cell on which the feedback message is scheduled.

Aspect 9: The method of any of aspects 1 through 8, further comprising: performing the cell switch between the first cell and the second cell of the cell group according to a cell switching mode indicated in the control signaling.

Aspect 10: A method for wireless communications at a UE, comprising: monitoring for one or more downlink data messages, the one or more downlink data messages associated with a first time interval allocated for transmission of a feedback message associated with the one or more downlink data messages on a first cell; performing a BWP switch from a first BWP to a second BWP on the first cell prior to a second time interval that occurs after the first time interval; receiving DCI triggering a retransmission of the feedback message; and retransmitting, during the second time interval, the feedback message, or determining not to retransmit the feedback message during the second time interval, in accordance with a feedback retransmission scheme, wherein the feedback retransmission scheme indicates whether to retransmit or skip retransmission of the feedback message based at least in part on one or more of whether cell switching is configured for the first cell, or the BWP switch, or on which of the first cell or a second cell retransmission of the feedback message is scheduled.

Aspect 11: The method of aspect 10, further comprising: determining not to retransmit the feedback message during the second time interval in accordance with the feedback retransmission scheme indicating an error case based at least in part on one or more of whether cell switching is configured for the first cell, on which of the first cell or a second cell switching from the first BWP to the second BWP occurs, or on which of the first cell or second cell the retransmission of the feedback message is scheduled.

Aspect 12: The method of any of aspects 10 through 11, further comprising: determining not to retransmit the feedback message during the second time interval in accordance with the feedback retransmission scheme indicating to skip the retransmission based at least in part on one or more of whether cell switching is configured for the first cell, on which of the first cell or a second cell switching from the first BWP to the second BWP occurs, or on which of the first cell or second cell the retransmission of the feedback message is scheduled.

Aspect 13: The method of any of aspects 10 through 12, further comprising: determining whether to retransmit the feedback message or skip the feedback message in accordance with the feedback retransmission scheme based at least in part on whether receiving the DCI occurs before or after performing the BWP switch.

Aspect 14: The method of any of aspects 10 through 13, further comprising: receiving control signaling indicating a timing offset between the first time interval allocated for the transmission of the feedback message and a third time interval in which the DCI triggering the retransmission of the feedback message is received, wherein retransmitting the feedback message occurs on the second BWP and is based at least in part on the timing offset according to a time interval duration associated with the second BWP.

Aspect 15: The method of aspect 14, further comprising: retransmitting the feedback message in a first uplink time interval of the second BWP that overlaps in time with a second uplink time interval of the first BWP, wherein the second uplink time interval of the first BWP occurs after the timing offset.

Aspect 16: The method of any of aspects 10 through 15, wherein the first BWP comprises an uplink BWP on the first cell and the second BWP comprises an uplink BWP on the first cell.

Aspect 17: The method of any of aspects 10 through 16, wherein the first BWP comprises a downlink BWP and the second BWP comprises a downlink BWP.

Aspect 18: The method of any of aspects 10 through 17, further comprising: receiving control signaling indicating a first cell switch mode for switching between the first cell and the second cell that correspond to a cell group, wherein retransmitting the feedback message, or determining not to retransmit the feedback message, is based at least in part on the first cell switch mode.

Aspect 19: The method of aspect 18, wherein the transmission of the feedback message, a retransmission of the feedback message, or both, are scheduled on a secondary cell of the cell group.

Aspect 20: The method of any of aspects 10 through 19, wherein the UE operates according to a first cell switch mode that does not support switching for the first cell a cell group, and retransmitting the feedback message, or determining not to retransmit the feedback message, is based at least in part on the first cell switch mode.

Aspect 21: A method for wireless communications at a network entity, comprising: transmitting control signaling to perform a cell switch between a first cell and a second cell of a cell group; transmitting a downlink data message during a first time interval that occurs prior to a BWP switch from a first BWP to a second BWP on one of the first cell or the second cell, wherein a second time interval after the first time interval is allocated for a feedback message associated with the downlink data message; and receiving the feedback message according to a feedback scheme, wherein the feedback scheme indicates whether to exclude or include feedback information corresponding to the downlink data message based at least in part on one or more of the cell switch, a BWP switch, or which of the first cell or the second cell the feedback message is scheduled for transmission.

Aspect 22: The apparatus of aspect 21, further comprising: transmit control RRC signaling indicating that the cell switch is based at least in part on a semi-static cell switching mode, wherein the feedback scheme indicates to exclude or include the feedback information corresponding to the downlink data message based at least in part on the semi-static cell switching mode.

Aspect 23: The apparatus of any of aspects 21 through 22, further comprising: perform the BWP switch from the first BWP to the second BWP on the first cell that is a primary cell, wherein the feedback scheme indicates to exclude the feedback information corresponding to the downlink data message based at least in part on performing the BWP switch on the primary cell.

Aspect 24: The apparatus of any of aspects 21 through 23, wherein receiving the feedback message comprises: receiving the feedback message on the second cell, wherein the first cell comprises a primary cell and the second cell comprises a secondary cell, and wherein the feedback scheme indicates to exclude the feedback information corresponding to the downlink data message based at least in part on performing the BWP switch on the second cell and the feedback message being receiving on the second cell.

Aspect 25: The apparatus of any of aspects 21 through 24, wherein receiving the feedback message comprises: receiving the feedback message on the first cell, wherein the first cell comprises a primary cell and the second cell comprises a secondary cell, and wherein the feedback scheme indicates to include the feedback information corresponding to the downlink data message based at least in part on performing the BWP switch on the second cell and the feedback message being receiving on the first cell.

Aspect 26: The apparatus of any of aspects 21 through 25, wherein transmitting the control signaling comprising transmitting control signaling indicating that the cell switch is based at least in part on a dynamic cell switching mode, wherein the feedback scheme indicates to exclude or include the feedback information corresponding to the downlink data message based at least in part on the dynamic cell switching mode.

Aspect 27: The apparatus of any of aspects 21 through 26, wherein the feedback scheme indicates to exclude the feedback information corresponding to the downlink data message based at least in part on performing the BWP switch on the cell on which the feedback message is scheduled.

Aspect 28: A method for wireless communications at a network entity, comprising: transmitting one or more downlink data messages, the one or more downlink data messages associated with a first time interval allocated for a feedback message associated with the one or more downlink data messages from a UE on a first cell; performing a BWP switch from a first BWP to a second BWP on the first cell prior to a second time interval that occurs after the first time interval; transmitting DCI triggering a retransmission of the feedback message; and receiving, during the second time interval, the feedback message, or determining not to monitor for the feedback message during the second time interval, in accordance with a feedback retransmission scheme, wherein the feedback retransmission scheme indicates whether retransmission of the feedback message occurs or is skipped based at least in part on one or more of whether cell switching is configured for the first cell, or the BWP switch, or on which of the first cell or a second cell the retransmission of the feedback message is scheduled.

Aspect 29: The apparatus of aspect 28, further comprising: determining not to monitor for, or failing to receive, the feedback message during the second time interval in accordance with the feedback retransmission scheme indicating an error case based at least in part on one or more of whether cell switching is configured for the first cell, on which of the first cell or a second cell switching from the first BWP to the second BWP occurs, or on which of the first cell or second cell the retransmission of the feedback message is scheduled.

Aspect 30: The apparatus of any of aspects 28 through 29, further comprising: determining not to monitor for, or failing to receive, the feedback message during the second time interval in accordance with the feedback retransmission scheme indicating to skip retransmission of the feedback message based at least in part on one or more of whether cell switching is configured for the first cell, on which of the first cell or a second cell switching from the first BWP to the second BWP occurs, or on which of the first cell or second cell the retransmission of the feedback message is scheduled.

Aspect 31: An apparatus for wireless communications at a UE, comprising a processor; memory coupled with the processor; and instructions stored in the memory and executable by the processor to cause the apparatus to perform a method of any of aspects 1 through 9.

Aspect 32: An apparatus for wireless communications at a UE, comprising at least one means for performing a method of any of aspects 1 through 9.

Aspect 33: A non-transitory computer-readable medium storing code for wireless communications at a UE, the code comprising instructions executable by a processor to perform a method of any of aspects 1 through 9.

Aspect 34: An apparatus for wireless communications at a UE, comprising a processor; memory coupled with the processor; and instructions stored in the memory and executable by the processor to cause the apparatus to perform a method of any of aspects 10 through 20.

Aspect 35: An apparatus for wireless communications at a UE, comprising at least one means for performing a method of any of aspects 10 through 20.

Aspect 36: A non-transitory computer-readable medium storing code for wireless communications at a UE, the code comprising instructions executable by a processor to perform a method of any of aspects 10 through 20.

Aspect 37: An apparatus for wireless communications at a network entity, comprising a processor; memory coupled with the processor; and instructions stored in the memory and executable by the processor to cause the apparatus to perform a method of any of aspects 21 through 27.

Aspect 38: An apparatus for wireless communications at a network entity, comprising at least one means for performing a method of any of aspects 21 through 27.

Aspect 39: A non-transitory computer-readable medium storing code for wireless communications at a network entity, the code comprising instructions executable by a processor to perform a method of any of aspects 21 through 27.

Aspect 40: An apparatus for wireless communications at a network entity, comprising a processor; memory coupled with the processor; and instructions stored in the memory and executable by the processor to cause the apparatus to perform a method of any of aspects 28 through 30.

Aspect 41: An apparatus for wireless communications at a network entity, comprising at least one means for performing a method of any of aspects 28 through 30.

Aspect 42: A non-transitory computer-readable medium storing code for wireless communications at a network entity, the code comprising instructions executable by a processor to perform a method of any of aspects 28 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive control signaling to perform a cell switch between a first cell and a second cell of a cell group;
receive a downlink data message during a first time interval that occurs prior to a bandwidth part switch, wherein a second time interval after the first time interval is allocated for a feedback message associated with the downlink data message; and
transmit a feedback message according to a feedback scheme, wherein the feedback scheme indicates whether to exclude or include feedback information corresponding to the downlink data message based at least in part on one or more of the cell switch, a bandwidth part switch, or which of the first cell or the second cell the feedback message is scheduled for transmission.

2. The apparatus of claim 1, wherein the instructions to receive the control signaling are executable by the processor to cause the apparatus to:
receive radio resource control signaling indicating that the cell switch is based at least in part on a semi-static cell switching mode, wherein the feedback scheme indicates whether to exclude or include the feedback information corresponding to the downlink data message based at least in part on the semi-static cell switching mode.

3. The apparatus of claim 1, wherein the instructions are further executable by the processor to cause the apparatus to:
perform the bandwidth part switch from a first bandwidth part to a second bandwidth part on the first cell that is a primary cell, wherein the feedback scheme indicates to exclude the feedback information corresponding to the downlink data message based at least in part on performing the bandwidth part switch on the primary cell.

4. The apparatus of claim 1, wherein the instructions to transmit the feedback message are executable by the processor to cause the apparatus to:
transmit the feedback message on the second cell, wherein the first cell comprises a primary cell and the second cell comprises a secondary cell, and wherein the feedback scheme indicates to exclude the feedback information corresponding to the downlink data message based at least in part on performing the bandwidth part switch on the second cell and the feedback message being transmitted on the second cell.

5. The apparatus of claim 1, wherein the instructions to transmit the feedback message are executable by the processor to cause the apparatus to:
transmit the feedback message on the first cell, wherein the first cell comprises a primary cell and the second cell comprises a secondary cell, and wherein the feedback scheme indicates to include the feedback information corresponding to the downlink data message based at least in part on performing the bandwidth part switch on the second cell and the feedback message being transmitted on the first cell.

6. The apparatus of claim 1, wherein the instructions to receive the control signaling are executable by the processor to cause the apparatus to:
receive control signaling indicating that the cell switch is based at least in part on a dynamic cell switching mode, wherein the feedback scheme indicates to exclude or include the feedback information corresponding to the downlink data message based at least in part on the dynamic cell switching mode.

7. The apparatus of claim 1, wherein:
the feedback scheme indicates to exclude the feedback information corresponding to the downlink data message based at least in part on performing the bandwidth part switch on the first cell or the second cell on which the feedback message is scheduled.

8. The apparatus of claim 1, wherein:
the feedback scheme indicates to include the feedback information corresponding to the downlink data message based at least in part on performing the bandwidth part switch on a different cell than the first cell or the second cell on which the feedback message is scheduled.

9. The apparatus of claim 1, further comprising:
performing the cell switch between the first cell and the second cell of the cell group according to a cell switching mode indicated in the control signaling.

10. An apparatus for wireless communications at a network entity, comprising:
a processor;
memory coupled with the processor; and
instructions stored in the memory and executable by the processor to cause the apparatus to:
transmit control signaling to perform a cell switch between a first cell and a second cell of a cell group;
transmit a downlink data message during a first time interval that occurs prior to a bandwidth part switch from a first bandwidth part to a second bandwidth part on one of the first cell or the second cell, wherein a second time interval after the first time interval is allocated for a feedback message associated with the downlink data message; and
receive the feedback message according to a feedback scheme, wherein the feedback scheme indicates whether to exclude or include feedback information corresponding to the downlink data message based at least in part on one or more of the cell switch, a bandwidth part switch, or which of the first cell or the second cell the feedback message is scheduled for transmission.

11. The apparatus of claim 10, wherein the instructions are further executable by the processor to cause the apparatus to:
transmit control radio resource control signaling indicating that the cell switch is based at least in part on a semi-static cell switching mode, wherein the feedback scheme indicates to exclude or include the feedback information corresponding to the downlink data message based at least in part on the semi-static cell switching mode.

12. The apparatus of claim 10, wherein the instructions are further executable by the processor to:
perform the bandwidth part switch from the first bandwidth part to the second bandwidth part on the first cell that is a primary cell, wherein the feedback scheme indicates to exclude the feedback information corresponding to the downlink data message based at least in part on performing the bandwidth part switch on the primary cell.

13. The apparatus of claim 10, wherein the instructions to receive the feedback message are executable by the processor to cause the apparatus to:
receive the feedback message on the second cell, wherein the first cell comprises a primary cell and the second cell comprises a secondary cell, and wherein the feedback scheme indicates to exclude the feedback information corresponding to the downlink data message based at least in part on performing the bandwidth part switch on the second cell and the feedback message being receiving on the second cell.

14. The apparatus of claim 10, wherein the instructions to receive the feedback message are executable by the processor to cause the apparatus to:
receive the feedback message on the first cell, wherein the first cell comprises a primary cell and the second cell comprises a secondary cell, and wherein the feedback scheme indicates to include the feedback information corresponding to the downlink data message based at least in part on performing the bandwidth part switch on the second cell and the feedback message being receiving on the first cell.

15. The apparatus of claim 10, wherein the instructions to transmit the control signaling are executable by the processor to cause the apparatus to:
transmit control signaling indicating that the cell switch is based at least in part on a dynamic cell switching mode, wherein the feedback scheme indicates to exclude or include the feedback information corresponding to the downlink data message based at least in part on the dynamic cell switching mode.

16. The apparatus of claim 10, wherein the feedback scheme indicates to exclude the feedback information corresponding to the downlink data message based at least in part on performing the bandwidth part switch on the first cell or the second cell on which the feedback message is scheduled.

17. A method for wireless communications at a user equipment (UE), comprising:
receiving control signaling to perform a cell switch between a first cell and a second cell of a cell group;
receiving a downlink data message during a first time interval that occurs prior to a bandwidth part switch, wherein a second time interval after the first time interval is allocated for a feedback message associated with the downlink data message; and
transmitting a feedback message according to a feedback scheme, wherein the feedback scheme indicates whether to exclude or include feedback information corresponding to the downlink data message based at least in part on one or more of the cell switch, a bandwidth part switch, or which of the first cell or the second cell the feedback message is scheduled for transmission.

18. The method of claim 17, wherein receiving the control signaling comprises:
receiving radio resource control signaling indicating that the cell switch is based at least in part on a semi-static cell switching mode, wherein the feedback scheme indicates whether to exclude or include the feedback information corresponding to the downlink data message based at least in part on the semi-static cell switching mode.

19. The method of claim 17, further comprising:
performing the bandwidth part switch from a first bandwidth part to a second bandwidth part on the first cell that is a primary cell, wherein the feedback scheme indicates to exclude the feedback information corresponding to the downlink data message based at least in part on performing the bandwidth part switch on the primary cell.

20. The method of claim 17, wherein transmitting the feedback message comprises:
transmitting the feedback message on the second cell, wherein the first cell comprises a primary cell and the second cell comprises a secondary cell, and wherein the feedback scheme indicates to exclude the feedback information corresponding to the downlink data message based at least in part on performing the bandwidth part switch on the second cell and the feedback message being transmitted on the second cell.

21. The method of claim 17, wherein transmitting the feedback message comprises:
transmitting the feedback message on the first cell, wherein the first cell comprises a primary cell and the second cell comprises a secondary cell, and wherein the feedback scheme indicates to include the feedback information corresponding to the downlink data message based at least in part on performing the bandwidth part switch on the second cell and the feedback message being transmitted on the first cell.

22. The method of claim 17, wherein receiving the control signaling comprises:
receiving control signaling indicating that the cell switch is based at least in part on a dynamic cell switching mode, wherein the feedback scheme indicates to exclude or include the feedback information corresponding to the downlink data message based at least in part on the dynamic cell switching mode.

23. The method of claim 17, wherein:
the feedback scheme indicates to exclude the feedback information corresponding to the downlink data message based at least in part on performing the bandwidth part switch on the first cell or the second cell on which the feedback message is scheduled.

24. The method of claim 17, wherein:
the feedback scheme indicates to include the feedback information corresponding to the downlink data message based at least in part on performing the bandwidth part switch on a different cell than the first cell or the second cell on which the feedback message is scheduled.

25. The method of claim 17, further comprising:
performing the cell switch between the first cell and the second cell of the cell group according to a cell switching mode indicated in the control signaling.

26. A method for wireless communications at a user equipment (UE), comprising:
transmitting control signaling to perform a cell switch between a first cell and a second cell of a cell group;
transmitting a downlink data message during a first time interval that occurs prior to a bandwidth part switch from a first bandwidth part to a second bandwidth part on one of the first cell or the second cell, wherein a second time interval after the first time interval is allocated for a feedback message associated with the downlink data message; and
receiving the feedback message according to a feedback scheme, wherein the feedback scheme indicates whether to exclude or include feedback information corresponding to the downlink data message based at least in part on one or more of the cell switch, a bandwidth part switch, or which of the first cell or the second cell the feedback message is scheduled for transmission.

27. The method of claim 26, further comprising:
transmitting control radio resource control signaling indicating that the cell switch is based at least in part on a semi-static cell switching mode, wherein the feedback scheme indicates to exclude or include the feedback information corresponding to the downlink data message based at least in part on the semi-static cell switching mode.

28. The method of claim 26, further comprising:
performing the bandwidth part switch from the first bandwidth part to the second bandwidth part on the first cell that is a primary cell, wherein the feedback scheme indicates to exclude the feedback information corresponding to the downlink data message based at least in part on performing the bandwidth part switch on the primary cell.

29. The method of claim 26, further comprising:
receiving the feedback message on the second cell, wherein the first cell comprises a primary cell and the second cell comprises a secondary cell, and wherein the feedback scheme indicates to exclude the feedback information corresponding to the downlink data message based at least in part on performing the bandwidth part switch on the second cell and the feedback message being receiving on the second cell.

30. The method of claim 26, further comprising:
receiving the feedback message on the first cell, wherein the first cell comprises a primary cell and the second cell comprises a secondary cell, and wherein the feedback scheme indicates to include the feedback information corresponding to the downlink data message based at least in part on performing the bandwidth part switch on the second cell and the feedback message being receiving on the first cell.

\* \* \* \* \*